(12) United States Patent
Monsen et al.

(10) Patent No.: US 12,059,835 B2
(45) Date of Patent: Aug. 13, 2024

(54) BLOW MOLDED PART INCLUDING COMPRESSION MOLDED ELEMENT

(71) Applicant: Lifetime Products, Inc., Clearfield, UT (US)

(72) Inventors: Charles Monsen, Clinton, UT (US); Samuel S. Robbins, South Ogden, UT (US); Wendell B. Peery, Kaysville, UT (US); Dennis Jay Norman, Syracuse, UT (US); Gary Phillips, Layton, UT (US)

(73) Assignee: LIFETIME PRODUCTS, INC., Clearfield, UT (US)

( * ) Notice: Subject to any disclaimer, the term of this patent is extended or adjusted under 35 U.S.C. 154(b) by 310 days.

(21) Appl. No.: 16/999,740

(22) Filed: Aug. 21, 2020

(65) Prior Publication Data

US 2020/0376735 A1    Dec. 3, 2020

Related U.S. Application Data

(62) Division of application No. 15/789,616, filed on Oct. 20, 2017, now Pat. No. 10,899,063.

(Continued)

(51) Int. Cl.
*B29C 49/48*    (2006.01)
*B29C 43/36*    (2006.01)
(Continued)

(52) U.S. Cl.
CPC ........ *B29C 49/4802* (2013.01); *B29C 43/361* (2013.01); *B29C 49/36* (2013.01);
(Continued)

(58) Field of Classification Search
CPC .............. B29C 43/361; B29C 49/4268; B29C 49/4273; B29C 49/4802; B29C 2043/3613
See application file for complete search history.

(56) References Cited

U.S. PATENT DOCUMENTS 3,928,522 A * 12/1975 Farrell .................... B29C 49/16
                                                        264/161
4,170,622 A * 10/1979 Uhlig .................. B29C 49/4802
                                                        215/382

(Continued)

FOREIGN PATENT DOCUMENTS

WO    2006/025890 A2    3/2006

OTHER PUBLICATIONS

A Design Guide on Optimizing Parting Lines in Injection Molding, Rapid Direct, https://www.rapiddirect.com/blog/parting-line/ (Year: 2021).*

(Continued)

*Primary Examiner* — Russell E Sparks
(74) *Attorney, Agent, or Firm* — Workman Nydegger

(57) ABSTRACT

In one example, a method includes positioning a tool in a mold, forming a parison of melted plastic, closing the mold around the parison and tool such that part of the tool is positioned between a portion of the mold and the parison, creating a blow molded structure by inflating the parison so that the melted plastic comes into contact with an interior portion of the mold and into contact with the tool, and after the mold is closed, operating the tool to form an integral compression molded element within the mold, and a parting line formed by the mold in the blow molded structure forms no part of the integral compression molded element.

20 Claims, 18 Drawing Sheets

Related U.S. Application Data

(60) Provisional application No. 62/412,190, filed on Oct. 24, 2016.

(51) Int. Cl.
| | |
|---|---|
| *B29C 49/36* | (2006.01) |
| *B29C 49/42* | (2006.01) |
| *B63B 32/57* | (2020.01) |
| *A47B 13/00* | (2006.01) |
| *A47B 13/08* | (2006.01) |
| *A47C 5/12* | (2006.01) |
| *A63B 63/08* | (2006.01) |
| *A63G 31/00* | (2006.01) |
| *B29C 49/04* | (2006.01) |
| *B29K 23/00* | (2006.01) |
| *B29L 31/30* | (2006.01) |
| *B29L 31/44* | (2006.01) |
| *B29L 31/52* | (2006.01) |

(52) U.S. Cl.
CPC ...... *B29C 49/4268* (2013.01); *B29C 49/4273* (2013.01); *B63B 32/57* (2020.02); *A47B 13/00* (2013.01); *A47B 13/08* (2013.01); *A47C 5/12* (2013.01); *A63B 63/083* (2013.01); *A63G 31/00* (2013.01); *B29C 2043/3613* (2013.01); *B29C 49/04* (2013.01); *B29C 49/4812* (2022.05); *B29C 2793/0018* (2013.01); *B29K 2023/065* (2013.01); *B29K 2905/02* (2013.01); *B29K 2905/12* (2013.01); *B29L 2031/3067* (2013.01); *B29L 2031/44* (2013.01); *B29L 2031/52* (2013.01); *B29L 2031/5272* (2013.01)

(56) References Cited

U.S. PATENT DOCUMENTS

| | | |
|---|---|---|
| 5,507,484 A | 4/1996 | Van et al. |
| 5,705,239 A | 1/1998 | Andersen et al. |
| 6,659,750 B1 | 12/2003 | Overmyer et al. |
| 7,744,365 B2 * | 6/2010 | Maddox .............. B29C 49/4802 425/522 |
| 8,636,944 B2 * | 1/2014 | Kelley ................. B29C 49/541 264/534 |
| 9,616,608 B2 * | 4/2017 | Coing .................... B29C 49/20 |
| 9,706,818 B2 * | 7/2017 | Knopow ............... B29C 51/105 |
| 10,899,063 B2 | 1/2021 | Monsen et al. |
| 2002/0010059 A1 | 1/2002 | Selsam |
| 2003/0042649 A1 | 3/2003 | Bernard |
| 2004/0051215 A1 | 3/2004 | Wong |
| 2005/0160950 A1 | 7/2005 | Haney et al. |
| 2012/0024219 A1 | 2/2012 | Eckert et al. |
| 2013/0061554 A1 | 3/2013 | Haney et al. |
| 2014/0175710 A1 | 6/2014 | Groman |

OTHER PUBLICATIONS

International Preliminary Report on Patentability dated May 9, 2019, issued in PCT Application No. PCT/US2017/057862, filed Oct. 23, 2017.

International Search Report and Written Opinion dated Jan. 8, 2018, issued in PCT Application No. PCT/US2017/057862, filed Oct. 23, 2017.

U.S. Provisional Application filed Oct. 24, 2016, by Monsen et al., U.S. Appl. No. 62/412,190.

* cited by examiner

BLOW MOLDED PART INCLUDING COMPRESSION MOLDED ELEMENT

RELATED APPLICATION

This application hereby claims priority to U.S. patent application, Ser. No. 15/789,616, entitled BLOW MOLDED PART INCLUDING COMPRESSION MOLDED ELEMENT, and filed Oct. 20, 2017 (the "'616 Application), and the '616 Application claims priority to U.S. Provisional Patent Application, Ser. 62/412,190, entitled BLOW MOLDED PART INCLUDING COMPRESSION MOLDED ELEMENT, and filed Oct. 24, 2016. All of the aforementioned applications are incorporated herein in their respective entireties by this reference.

FIELD OF THE INVENTION

The present invention generally relates to blow-molded structures, as well as any devices that include blow-molded structures, without any limit or restriction as to the specific nature of any particular blow-molded structure. Thus, example embodiments embraced within the scope of this disclosure include, but are not limited to, water sports equipment and watercraft such as kayaks and paddleboards, tables including picnic tables, chairs, storage sheds, playground equipment, and storage boxes for decks and patios. In more detail, example embodiments of the invention are directed to blow-molded structures or parts that include one or more integral compression molded elements.

BACKGROUND

Blow molding processes can be used to create a variety of different structures. In some instances, it is useful to include a compression molded element as part of the blow-molded structure. Depending upon their nature and configuration, some of the compression molded elements that have been incorporated in blow-molded structures can be somewhat limited in terms of their location within the blow-molded structure.

As well, compression molded elements are typically limited to specific orientations. In particular, conventional compression molded elements are limited to orientations that are parallel to the plane in which the parting line of the blow-molded element lies, that is, the line where the split between the mold halves is located.

In light of problems such as these, it would be useful to be able to include a compression molded element in a blow-molded structure without limitation as to the orientation, location, or configuration of the compression molded element.

BRIEF SUMMARY OF ASPECTS OF SOME EXAMPLE EMBODIMENTS

Various disclosed embodiments generally relate to blow-molded structures, as well as any devices that include blow-molded structures, without any limit or restriction as to the specific nature of any particular blow-molded structure. These blow-molded structures can include one or more compression molded elements integrally formed, during the blow molding process, as part of the blow-molded structure. The compression molded elements can assume a variety of different configurations and orientations, and may be located anywhere in the blow-molded structure. Thus, for example, some embodiments include one or more compression molded elements that generally lie in a plane that is non-parallel with respect to a plane in which part or all of a parting line lies. In some embodiments, the parting line may have a generally horizontal orientation, or a generally vertical orientation.

The embodiments disclosed herein, some examples of which are set forth below, do not constitute an exhaustive summary of all possible embodiments, nor does this summary constitute an exhaustive list of all aspects of any particular embodiment(s). Rather, this summary simply presents selected aspects of some example embodiments. It should be noted that nothing herein should be construed as constituting an essential, critical or indispensable element of any invention or embodiment. Rather, and as the person of ordinary skill in the art will readily appreciate, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular effect(s).

In particular, example embodiments within the scope of this disclosure may include one or more of the following elements, in any combination: a blow-molded structure having a unitary-one piece construction that includes one or more compression molded elements that are integral with the blow-molded structure; a blow-molded structure having a unitary-one piece construction that includes an integral compression molded element that generally lies in a plane that is non-parallel with respect to a plane in which part or all of a parting line of the blow-molded structure lies; a blow-molded structure having a unitary-one piece construction that includes an integral compression molded element that generally lies in a plane that is at least approximately perpendicular with respect to a plane in which part or all of a parting line of the blow-molded structure lies; a blow-molded structure having a unitary-one piece construction that includes an integral compression molded element that generally lies in a plane that is parallel with respect to a plane in which a parting line of the blow-molded structure lies; a blow-molded structure having a unitary-one piece construction that includes an integral compression molded element that has a generally planar configuration that includes a pair of generally parallel surfaces; a blow-molded structure having a unitary-one piece construction that includes an integral compression molded element that has a generally non-planar configuration; a blow-molded structure having a unitary-one piece construction that includes an integral compression molded element that has a solid, that is, non-hollow, construction; a blow-molded structure having a unitary-one piece construction that includes an integral compression molded element that is not formed by the mold that is used to create other portions of the blow-molded structure; a blow-molded structure having a unitary-one piece construction that includes an integral compression molded element that is formed entirely by a mechanism other than the mold that is used to create other portions of the blow-molded structure; a blow-molded structure having a unitary-one piece construction that includes an integral compression molded element that is formed in part by a mechanism other than the mold that is used to create other portions of the blow-molded structure; a blow-molded structure having a unitary-one piece construction that includes an integral compression molded element that is located in a location other than at or near an edge of the blow-molded structure; a blow-molded structure having a unitary-one piece construction that includes an integral compression molded element that is located in a location other than at/near a parting line of the blow-molded structure; a blow-molded structure having a unitary-one piece construction that includes an integral compression molded element that is located in a location other than at or near an edge of the blow-molded structure, and the integral compression molded element includes one or more holes, depressions and/or indentations formed during the blow-molding process; and, a blow-molded structure having a unitary-one piece construction that includes an integral compression molded element having a hole or depression.

Embodiments within the scope of this disclosure also include blow-molding processes which can be used to create any of the disclosed blow-molded structures. Yet other embodiments within the scope of this disclosure are directed to a tool having one or more movable portions such that when the tool is disposed within a mold, the one or more movable portions of the tool operate to create a compression molded element when the mold and tool are employed in a blow-molding process. As such, embodiments within the scope of this disclosure also embrace methods in which one or more compression molded elements is/are created simultaneously, and integrally, with a blow-molded structure, where the compression molded element can be located anywhere in the blow-molded structure.

In any of the disclosed embodiments, a blow-molded structure can be in the form of a unitary, one-piece structure that is substantially hollow and/or includes a substantially hollow portion. Thus, such embodiments may have an interior that is partly, or completely, hollow. Such embodiments may also include, disposed in the interior, one or more depressions, sometimes referred to as "tack-offs." In such embodiments, these tack-offs may be integrally formed as part of a unitary, one-piece structure during the blow-molding process. The depressions may extend from a first interior surface of the blow-molded structure towards a second interior surface of the blow-molded structure. The ends of one or more depressions may contact or engage the second surface, or the ends of one or more of the depressions may be spaced apart from the second surface by a distance. In some instances, one or more depressions on a first interior surface may be substantially aligned with corresponding depressions on a second interior surface, and one or more depressions on the first interior surface may contact one or more corresponding depressions on the second interior surface or, alternatively, one or more depressions on the first interior surface may be spaced apart from corresponding depressions on the second interior surface. In still other instances, depressions that contact each other and depressions that are spaced apart from each other may both be present in a blow-molded structure. The depressions may be sized and configured to strengthen and/or reinforce the blow-molded structure.

Following is a brief listing of various example embodiments within the scope of this disclosure. Yet other example embodiments are disclosed elsewhere herein.

In an example embodiment, a hollow plastic structure includes one or more integral compression molded elements.

In another example embodiment, a unitary one-piece plastic structure includes one or more integral compression molded elements.

In another example embodiment, a blow-molded structure includes an integral compression molded element.

In another example embodiment, a blow-molded structure includes an integral compression molded element that lies in a plane that is non-parallel with respect to a plane in which a portion of the parting line of the blow-molded structure lies.

In another example embodiment, a blow-molded structure includes an integral compression molded element that lies in a plane that is at least approximately parallel with respect to a plane in which a portion of the parting line of the blow-molded structure lies.

In another example embodiment, a blow-molded structure includes an integral compression molded element that is generally planar in form.

In another example embodiment, a blow-molded structure includes an integral compression molded element that is generally non-planar in form.

In another example embodiment, a blow-molded structure includes an integral compression element located anywhere in the blow-molded structure.

In another example embodiment, a blow-molded structure includes an integral compression molded element that includes an opening or depression.

In another example embodiment, a blow-molded structure includes an integral compression molded element that includes one or more surfaces that include a pattern and/or texture.

In another example embodiment, a blow-molded structure includes an integral compression molded element and a tack-off.

In another example embodiment, a structure with an integral compression molded element is created using one of the following processes: roto-molding, thermoforming, vacuum molding, twin sheet molding, or drape molding.

In another example embodiment, a blow-molding process and compression molding process are used to create any of the blow-molded structures of the aforementioned embodiments.

In another example embodiment, a method simultaneously creates a compression molded element and a blow-molded structure, such that the compression a molded element is integrally formed with the blow-molded structure, and the compression molded element can be located anywhere in the blow-molded structure.

In another example embodiment, a tool is provided that includes one or more movable portions such that when the tool is disposed within a mold, the one or more movable portions of the tool operate, during a blow-molding process to create a blow-molded structure, to form a compression molded element that is integral with the blow-molded structure.

In another example embodiment, a tool is provided that includes a plurality of movable portions such that when the tool is disposed within a mold, the movable portions of the tool operate, during a blow-molding process to create a blow-molded structure, to form a compression molded element that is integral with the blow-molded structure.

In another example embodiment, a tool is provided that includes a movable portion and a static portion such that when the tool is disposed within a mold, the movable portion of the tool cooperates, during a blow-molding process to create a blow-molded structure, with the static portion to form a compression molded element that is integral with the blow-molded structure.

In another example embodiment, a tool is provided that includes a movable portion such that when the tool is disposed within a mold, the movable portion of the tool cooperates, during a blow-molding process to create a blow-molded structure, with a portion of the mold to form a compression molded element that is integral with the blow-molded structure.

In another example embodiment, a tool is provided that includes a movable portion such that when the tool is disposed within a mold, the movable portion of the tool is disposed in a core side of the mold and cooperates, during a blow-molding process to create a blow-molded structure, with a portion of a cavity side of the mold to form a compression molded element that is integral with the blow-molded structure.

In another example embodiment, a configuration is provided that includes more than two compression elements, where none of the compression elements comprises a portion of a mold.

In another example embodiment, a configuration is provided that includes more than two compression elements, where one or more of the compression elements comprise a portion of a mold.

In another example embodiment, a configuration is provided that includes more than two compression elements, where one or more of the compression elements is movable relative to one or more of the other compression elements.

BRIEF DESCRIPTION OF THE DRAWINGS

The appended drawings contain figures of example embodiments to further illustrate and clarify the above and other aspects, advantages and features of the present invention. It will be appreciated that these drawings depict only example embodiments of the invention and are not intended to limit its scope. The invention will be described and explained with additional specificity and detail through the use of the accompanying drawings in which.

DETAILED DESCRIPTION OF EXAMPLE EMBODIMENTS

Embodiments of the present invention generally relate to blow-molded structures that include one or more integral compression molded elements. In some particular examples, one or more embodiments take the form of a watercraft such as paddleboards, kayaks including sit-on-top and sit-inside versions, as well as structures such as tables including picnic tables, chairs, storage sheds, playground equipment, bases and backboards for basketball systems, coolers, and storage boxes for decks and patios. More generally however, the scope of the invention is not limited to any of the aforementioned example structures and, instead embraces any blow-molded structure, and also any devices that include one or more blow-molded structures. The compression molded elements disclosed herein may be particularly useful in that due to their solid, rather than hollow, construction in at least some embodiments, the compression molded elements may be relatively stronger than a similarly configured hollow element.

A. General Aspects of Some Example Structures

Example molded structures within the scope of this disclosure can be made of any suitable material, including plastics such as high-density polyethylene (HDPE). Depending upon the embodiment, the molded structures can be formed by any of blow-molding, thermoforming, vacuum molding, twin sheet molding, or drape molding, or combinations of any of these. The molded structures can be hollow, or at least include one or more hollow portions. Such hollow portions can include, and/or be defined in whole or in part by, one or more tack-offs. As well, and discussed in further detail below, molded structures within the scope of this disclosure can include one or more compression molded elements that are integral with the molded structure.

Figure 1:
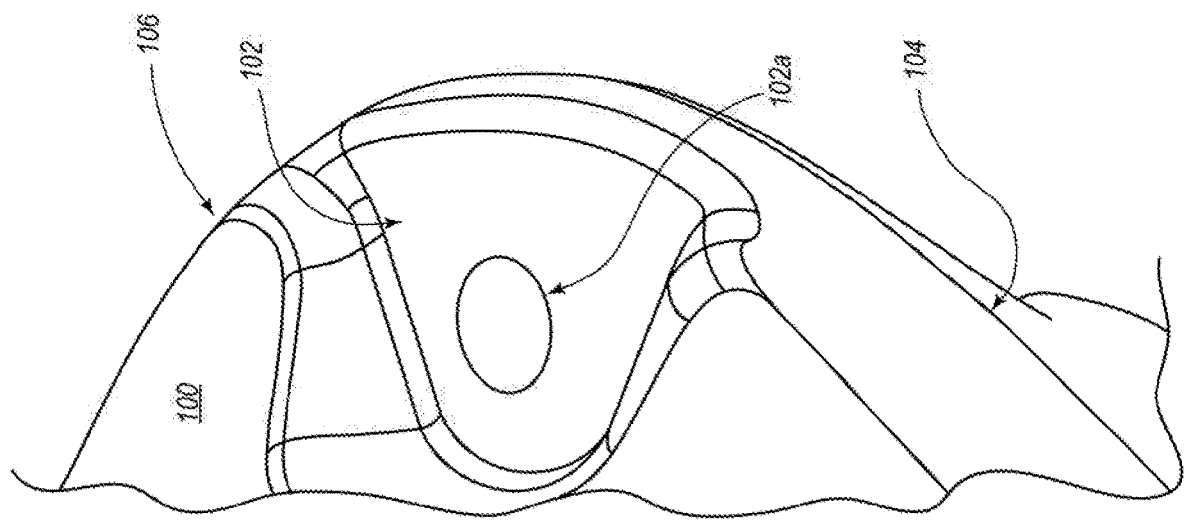
FIG. 1 is a top perspective view comparing an example of a compression molded element that lies in a plane parallel to a plane in which part of a parting line lies, with an example of a compression molded element that lies in a plane that is non-parallel with respect to a plane in which part of a parting line lies.
Figure 1:
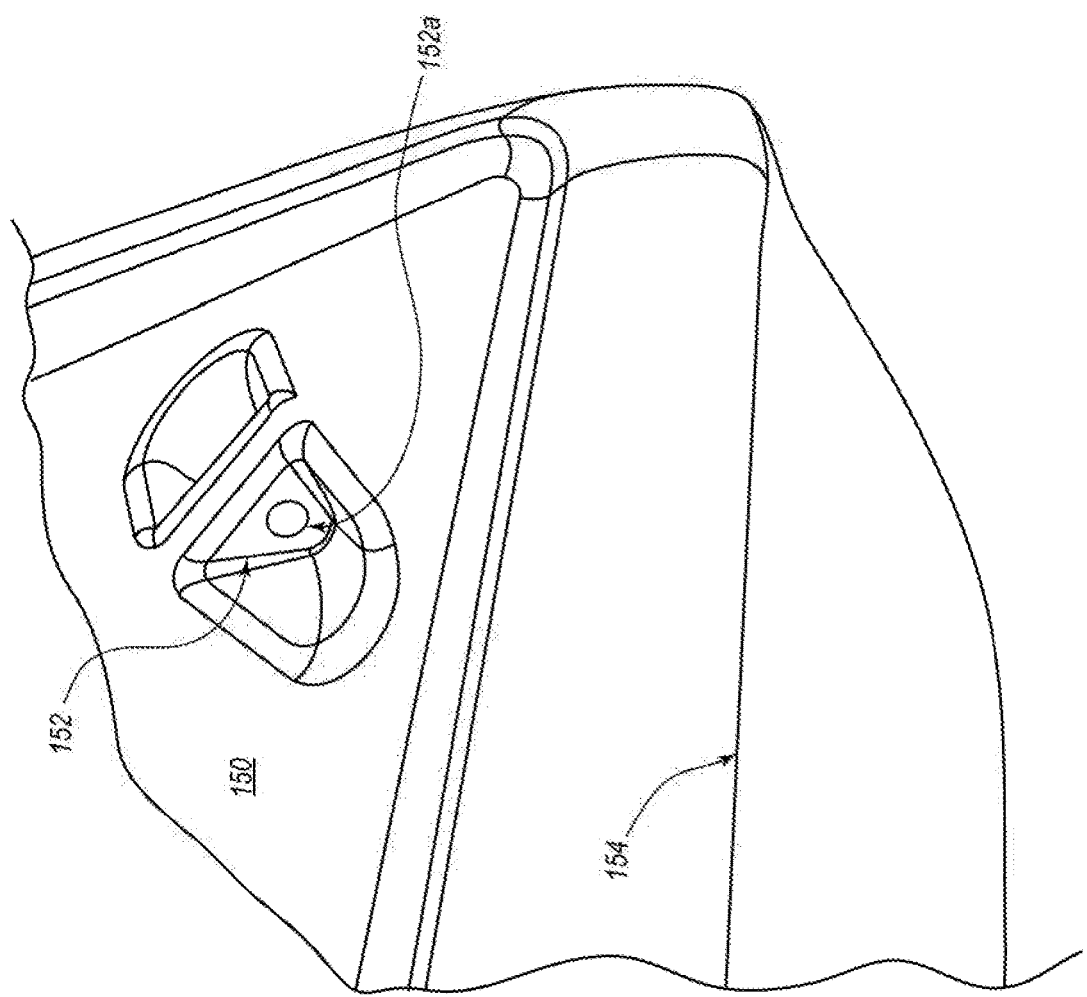
Figure 2:
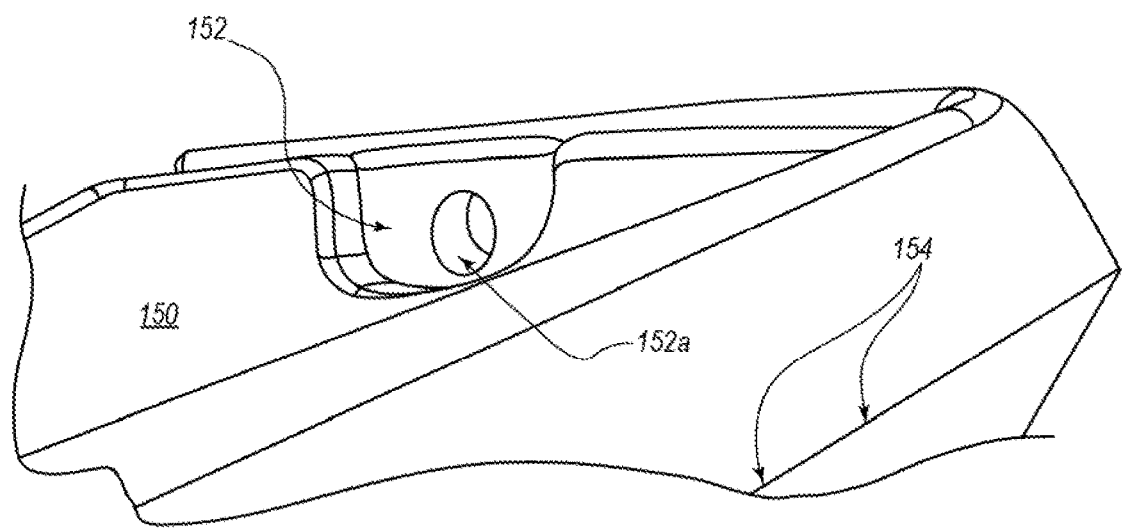
FIG. 2 is a side view of an example blow-molded structure that includes a compression molded element that lies in a plane that is non-parallel with respect to a plane in which part of a parting line lies.

With attention now to FIGS. 1-4, details are provided concerning some example structures. In FIG. 1, example blow-molded structures 100 and 150 are shown. The blow-molded structure 100 includes a compression molded element 102 at the edge of the blow-molded structure 100. It can be seen that the compression molded element 102 is in a plane generally parallel to a plane in which the parting line 104 of the blow-molded structure 100 lies. In general, the parting line 104 is created where mold halves come together as part of a blow-molding, or other molding, process.

The configuration and arrangement of the compression molded element 102 is a consequence of the fact that the edges of the mold (not shown) that form the blow-molded structure 100 are used to create the compression molded element 102. Thus, the compression molded element 102 necessarily lies in a plane that is parallel, or substantially parallel, to the plane in which part or all of the parting line 104 lies, since the mold halves (not shown) come together to form the compression molded element 102 while, at the same time, defining the parting line 104. In the illustrated example, the compression molded element 102 also includes a hole 102a that is formed by drilling after the molded structure has been removed from the mold. It will also be apparent from the blow-molded structure 100 that the parting line 104 defines at least part of, and/or is located at, a boundary of the compression molded element 102. Put another way, the parting line 104 is connected with, touches, is disposed upon, and/or forms a part of, the compression molded element 102.

In contrast, such characteristics are not, necessarily, present in the blow-molded structure 150 that is discussed below. That is, in at least some embodiments of the invention, of which the blow-molded structure 150 is but one illustrative example, a parting line 154 is not connected with, does not touch, is not disposed upon, and/or forms no part of, a compression molded element. In general, the parting line 154 is an integral plastic structure that is formed along a seam where mold halves come together as part of a blow-molding, or other molding, process. The parting line 154 may extend outwardly, if only slightly, from the surface of the blow-molded structure 150. In some cases, the parting line 154 may take the form of a small ridge, and may be non-uniform in one or more of its physical attributes, including height, thickness, and terminal edge. As well, the parting line 154 may be a continuous uninterrupted or unbroken structure, and in such cases, the parting line 154 may extend completely around a perimeter of the blow-molded structure 150. Alternatively, the parting line 154 may have a discontinuous structure that is broken at one or more locations.

As this example illustrates, the approach reflected in the blow-molded structure 100 is limited to the creation of compression molded elements, such as compression molded element 102, that are located at or near the edge 106 of the blow-molded structure 100. Put another way, the compression molded element 102 defines part of the edge 106 of the blow-molded structure 100. Another limitation with structures such as the example blow-molded structure 100 is that features such as the hold 102a must typically be created by a separate process after molding is completed.

In contrast with the example blow-molded structure 100, the blow-molded structure 150 includes a compression molded element 152 that lies in a plane that is non-parallel with respect to a plane in which part or all of the parting line 154 lies. For example, in this particular embodiment, the plane in which the compression molded element 152 lies is generally perpendicular to the plane in which the parting line 154 lies, although any other non-parallel arrangement of a compression molded element, relative to a plane associated with a parting line, can be employed.

Thus, although the formation of tack-offs can involve compression molding, the compression involved in the formation of tack-offs is performed exclusively by the mold halves rather than by tools and methods such as are disclosed herein. Correspondingly, compressed portions of the tack-offs typically reside in planes parallel to the parting line associated with the structure that includes the tack-offs. Accordingly, it should be apparent that the disclosed embodiments provide structures, functions and methods that represent advances beyond those associated with tack-offs. As well, the compression molded element 152 includes an integrally formed hole 152a, although that is not required. In other embodiments, the compression molded element 152 can include an indentation, or no indentation or hole at all. The hole 152a is formed during the molding process, rather than afterward as in the case of the blow molded structure 100. In brief, the tool in this example resides in a mold and serves to compress a portion of the molten plastic present in the mold between a pair of elements to form the compression molded element 152.

In the illustrated example, the compression molded element 152 is associated with a pair of recesses 155, although such recesses are not required or present in all embodiments.

Figure 3:
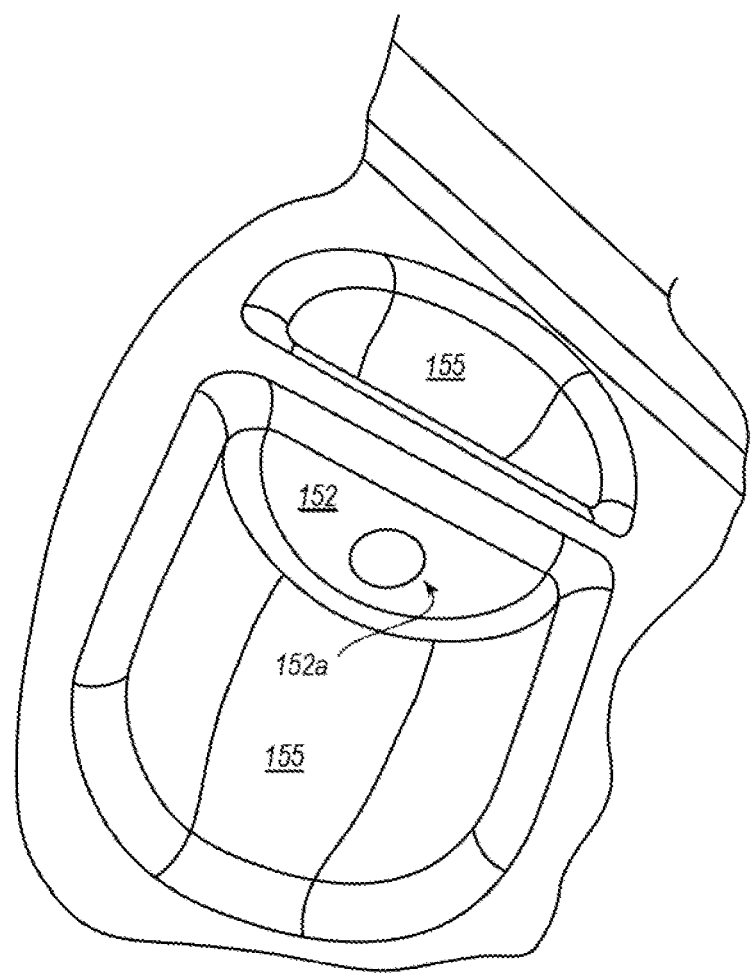
FIG. 3 is a detail view of the example compression molded element of FIG. 2.
Figure 4:
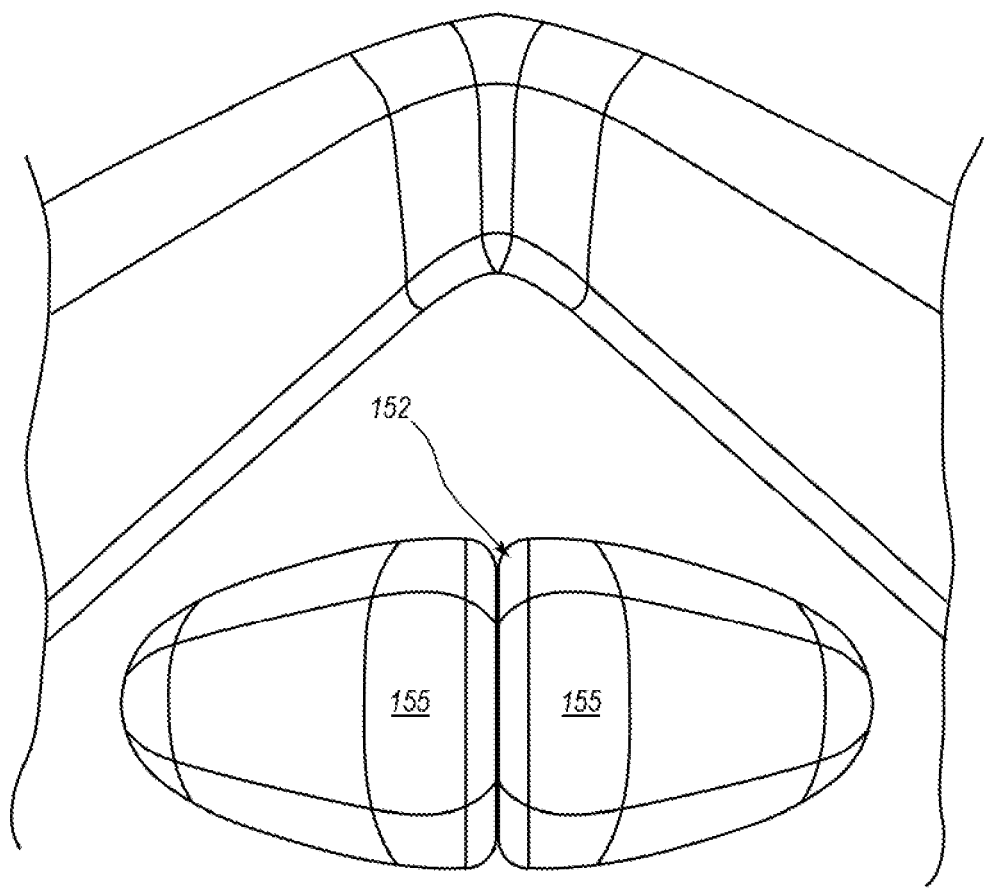
FIG. 4 is a view of the underside of an area near the compression molded element of FIG. 2.

See FIG. 4, which shows the bottom view of the compression molded element 152 and recesses 155, as seen from the interior of the blow-molded structure 150. As further apparent from FIGS. 1-4, one or both of the recesses 155 may be configured so as to have a concave form or configuration (see FIGS. 1-3) on the exterior of the blow-molded structure 150, and may be additionally configured to have a convex form or configuration (see FIG. 4) in the interior of the blow-molded structure.

In general, and as discussed in more detail below, features such as, but not limited to, the recesses 155 can be formed by a tool as part of the blow-molding process. That is, the recesses 155 and/or other features disclosed herein may be characteristic of the configuration and/or operation of the tool(s) used to create the compression molded element 152. Thus, features such as recesses 155 would not be present in conjunction with a compression molded element in a conventionally created blow molded structure, an example of which is the blow-molded structure 100 discussed above. As well, the recesses 155 may be mirror images of each other in some embodiments, although that is not necessarily required. In other embodiments, only a single recess may be present. As further indicated, the entire compression molded element 152 in the illustrated example is located within the interior of an envelope defined by the outer edges and surfaces of the blow-molded structure 150. In contrast, and as noted above, the compression molded element 102 is necessarily located near, and defines part of, the edge 106 of the blow-molded structure 100. Thus, the approach reflected in the example blow-molded structure 150 affords considerably more flexibility in the configuration, orientation and location of a compression molded element in a blow-molded structure, than is offered by the approach reflected in the example blow-molded structure 100.

B. General Aspects of Some Example Tools

With continuing attention to FIGS. 1-4, and directing attention now to FIGS. 5-9 as well, details are provided concerning some example tools that can be used to create compression molded structures in accordance with various example embodiments of the invention. One example tool is denoted generally at 200 and includes a dynamic compression element 202. The dynamic compression element 202 cooperates with a static compression element 204 to define various aspects of the configuration of an associated compression molded element. Yet other embodiments can employ a pair of dynamic compression elements, each movable relative to the other, rather than a static compression element and a dynamic compression element as in the embodiment of FIGS. 5-9. The dynamic and static compression elements 202 and 204 can be made of suitable material, including metals such as aluminum, aluminum alloys, steel, and stainless steel, for example. As well, the dynamic and static compression elements 202 and 204 can be made by any suitable process, or processes, including, casting, machining, stamping and forging.

In general, the dynamic compression element 202 and static compression element 204 are configured and arranged so that the dynamic compression element 202 has a defnded range of motion and can move toward, and away from, the static compression element 204. In the illustrated example, the motion of the dynamic compression element 202 is rotational in nature. However, in other embodiments, the motion of the dynamic compression element 202 can be linear in nature. Regardless of the embodiment, the range of motion of a dynamic compression element can be defined as needed, and the scope of the invention is not limited to any particular linear or rotational range of motion.

Motion of the dynamic compression element 202 can be effected in any suitable fashion, with any suitable devices and mechanisms. In the illustrated example, the dynamic compression element 202 is rotatably connected to an arm 220 that can be moved back and forth by an intermediate connecting element 222 that may, in turn, be connected directly or indirectly to a motor, for example. The dynamic compression element 202 can also rotate about a fixed axis 224, which can be defined by a shaft or pin for example, relative to the static compression element 204.

Figure 9:
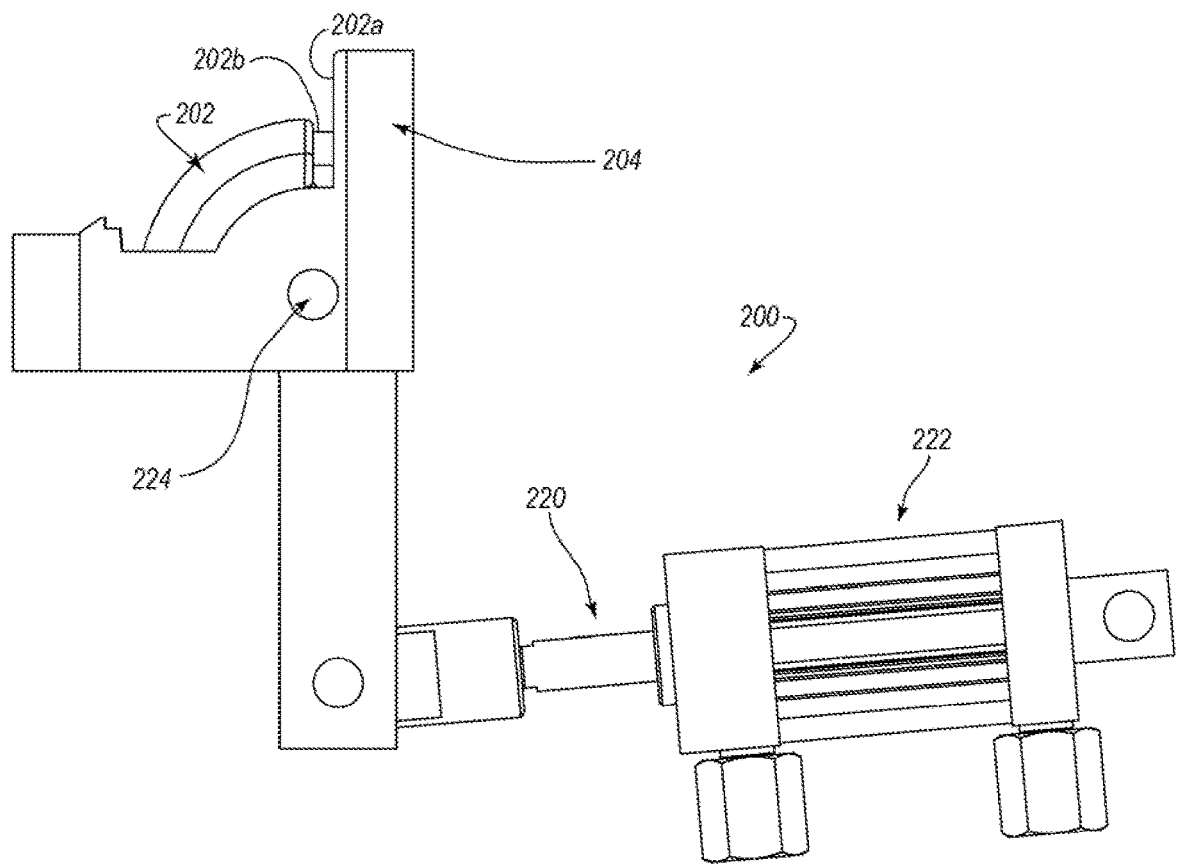
Figure 9A:
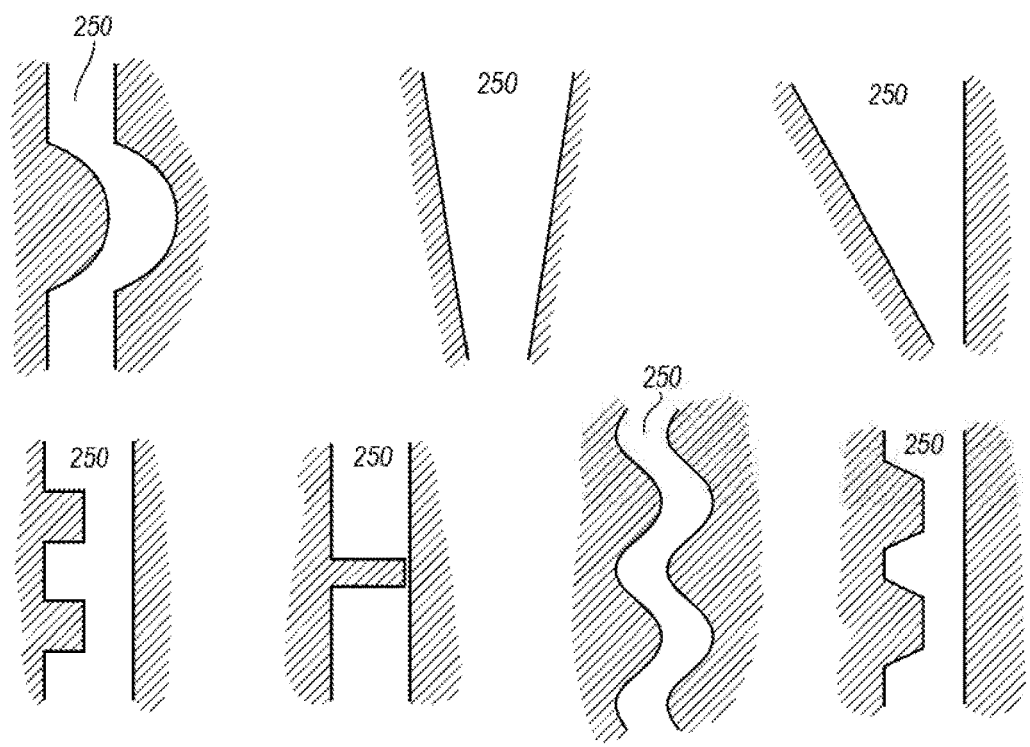
FIG. 9a discloses aspects of some example compression elements and geometric features such as gaps that may be defined by such example compression elements.

With continued reference to the Figures, the dynamic compression element 202 and static compression element 204 are configured and arranged so that when the dynamic compression element 202 is at its closest position to the static compression element 204, a gap 205 is defined between the dynamic compression element 202 and the static compression element 204. This gap 205 thus defines the thickness of a compression molded element that can be formed by the cooperation of the dynamic compression element 202 and the static compression element 204. As discussed below, it will be appreciated that aspects of a compression molded element can be obtained by appropriately configuring either, or both, of the respective portions of the dynamic compression element 202 and the static compression element 204 that define the gap By way of illustration, both the dynamic and static compression elements 202 and 204 include respective flat faces 202a and 204a, although other face shapes and configurations could be employed, as shown in FIG. 9a for example. As well, faces within the scope of this disclosure may be smooth, or textured in some way. In any case, when the dynamic compression element 202 is moved toward the static compression element 204, molten plastic in between the two faces 202a and 204a will be compressed into a configuration that includes two flat sides, as in the case of the example compression molded element 152 discussed above. As well, one or both of the faces 202a and 204a can include additional elements that may be used to define features of the resulting compression molded element.

By way of illustration, the example dynamic compression element 202 includes one or more protruding elements, such as a pin 202b, that is/are configured and arranged to contact the face 204a when the dynamic compression element 202 is at its closest position to the static compression element 204. In other embodiments, the pin 202b can be part of the static compression element 204, rather than being part of the dynamic compression element 202. In either case however, the pin 202b can be used to form a hole in the compression molded element, such as the hole 152a discussed above.

Figure 5:
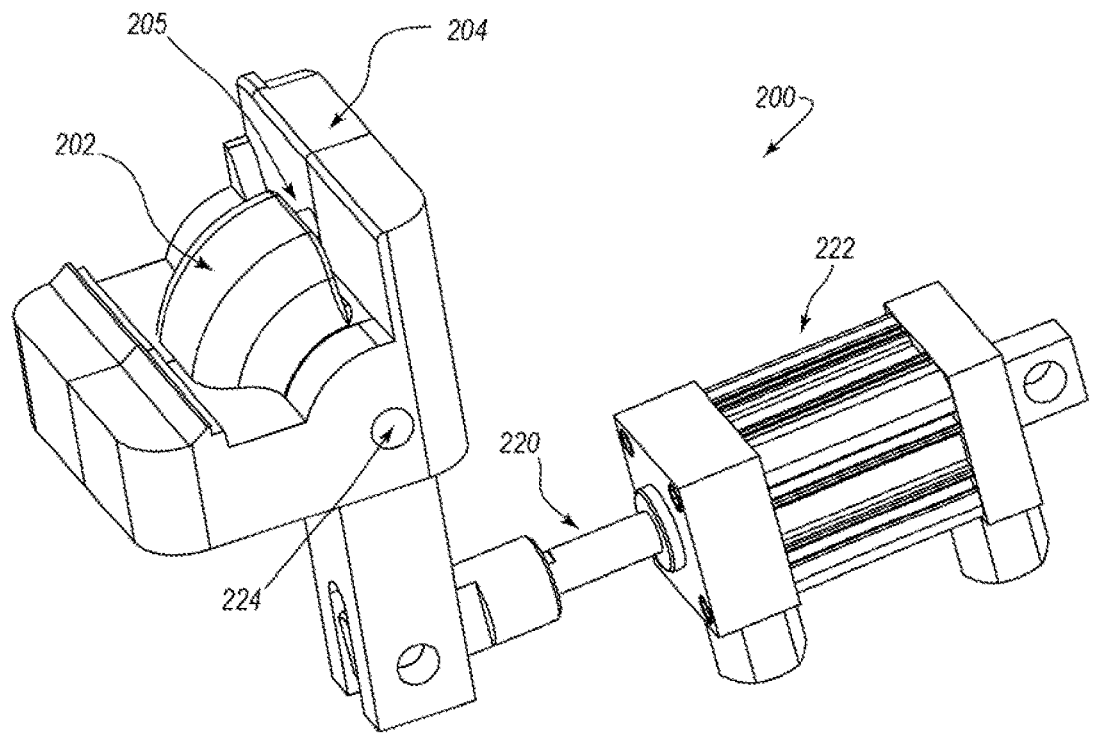
FIGS. 5-9 disclose aspects of a tool according to one example embodiment.
Figure 6:
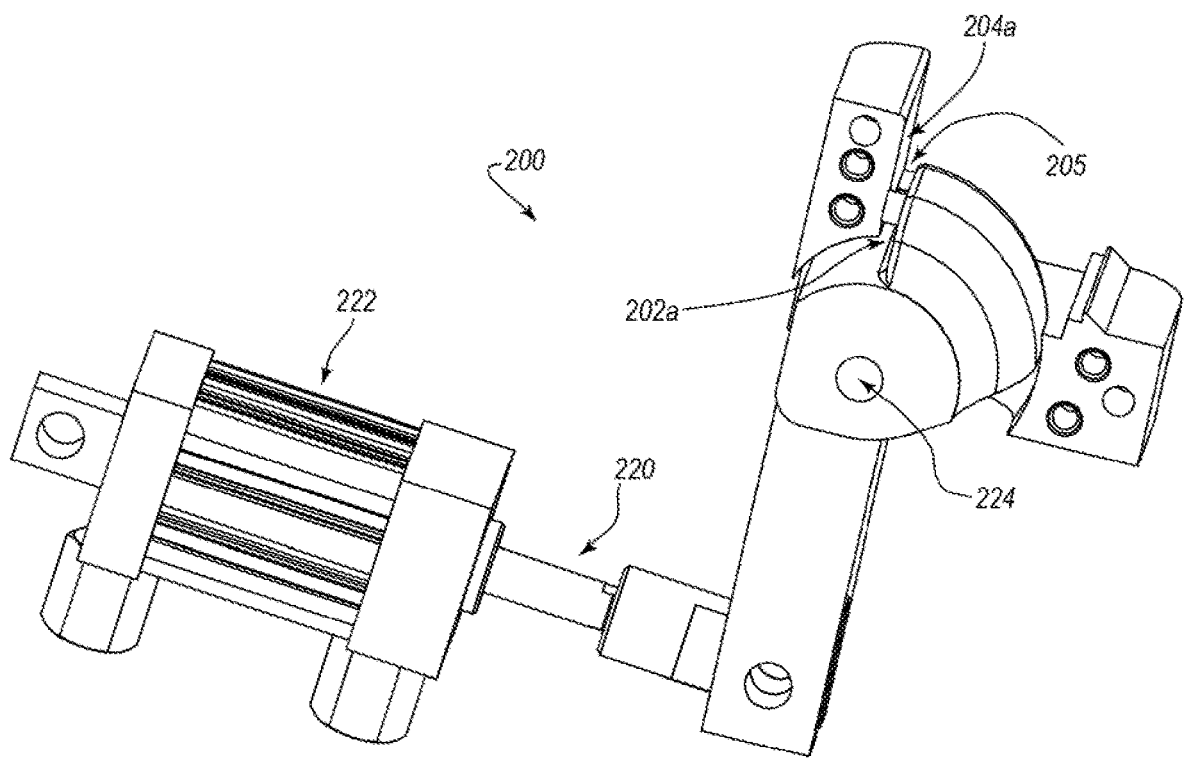
Figure 7:
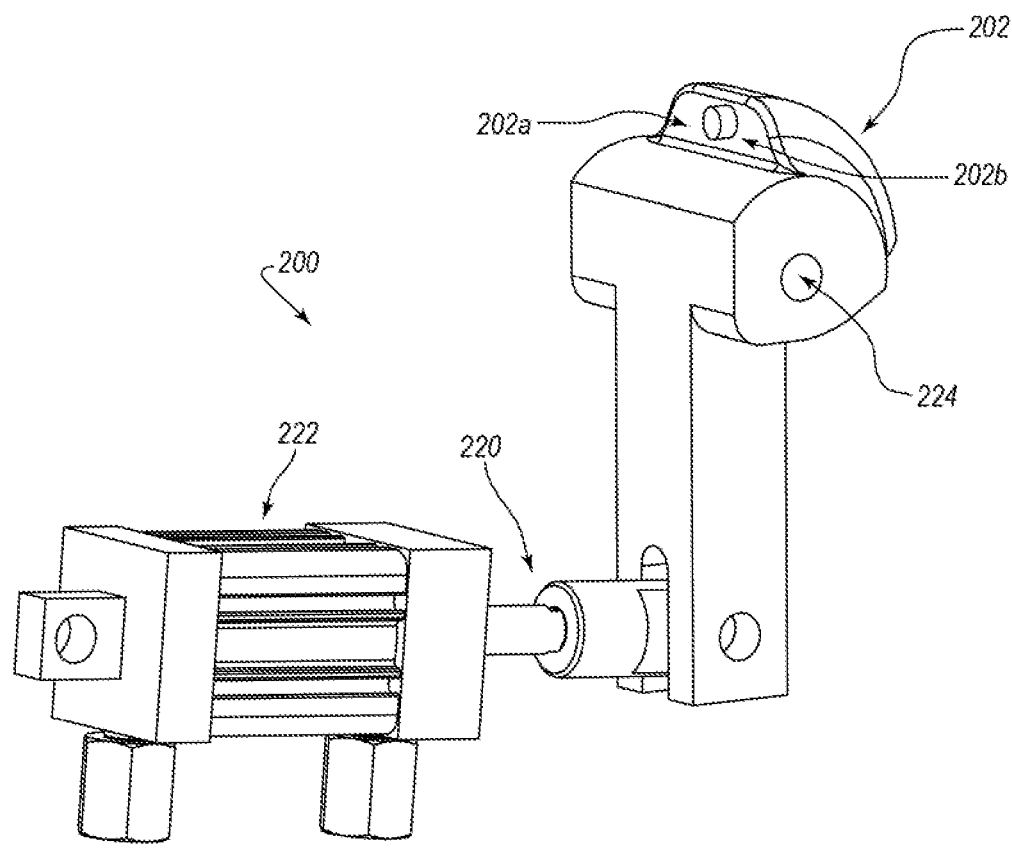
Figure 8:
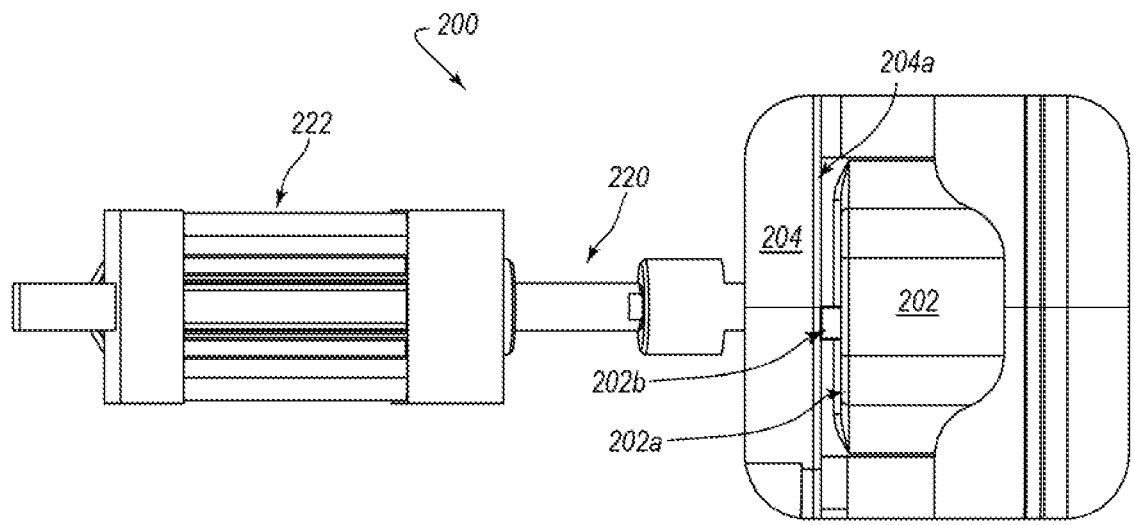

As will be apparent from this disclosure, such as FIG. 5 for example, the length of an element such as the pin 202b for example, may define a minimum width of a gap, such as the gap 150 for example. Consistently, other aspects of the geometry of an element such as the pin 202b may define corresponding aspects of a hole, such as the shape and diameter of the hole for example, in a compression molded element formed in connection with the pin 202b. In some alternative embodiments however, the pin or other protrusion may be omitted altogether from surfaces such as the surfaces 202a and 204a for example. That is, surfaces such as surface 202a and 204a may be free, or substantially free, of any protrusions or other projecting elements. In these alternative embodiments, other structures or mechanisms can be used to limit the range of travel of, for example, the dynamic compression element 202 relative to static compression element 204. As such, these alternative embodiments can produce a compression molded element that does not include any holes or other openings.

With reference briefly to FIG. 9a, it will be appreciated that there is an endless variety of compression molded elements that can be created according to this disclosure. As shown, various gap 250 configurations, which may be determined by the geometry of the corresponding compression molding tool, can be used to define example compression molded elements that can: vary in thickness throughout their cross-section; be planar or non-planar in form; include or omit holes and/or indentations; include smooth and/or textured surfaces; have non-uniform shapes; include one or more protruding elements; include one or more grooves or channels; or, include any combination of the foregoing.

Figure 10:
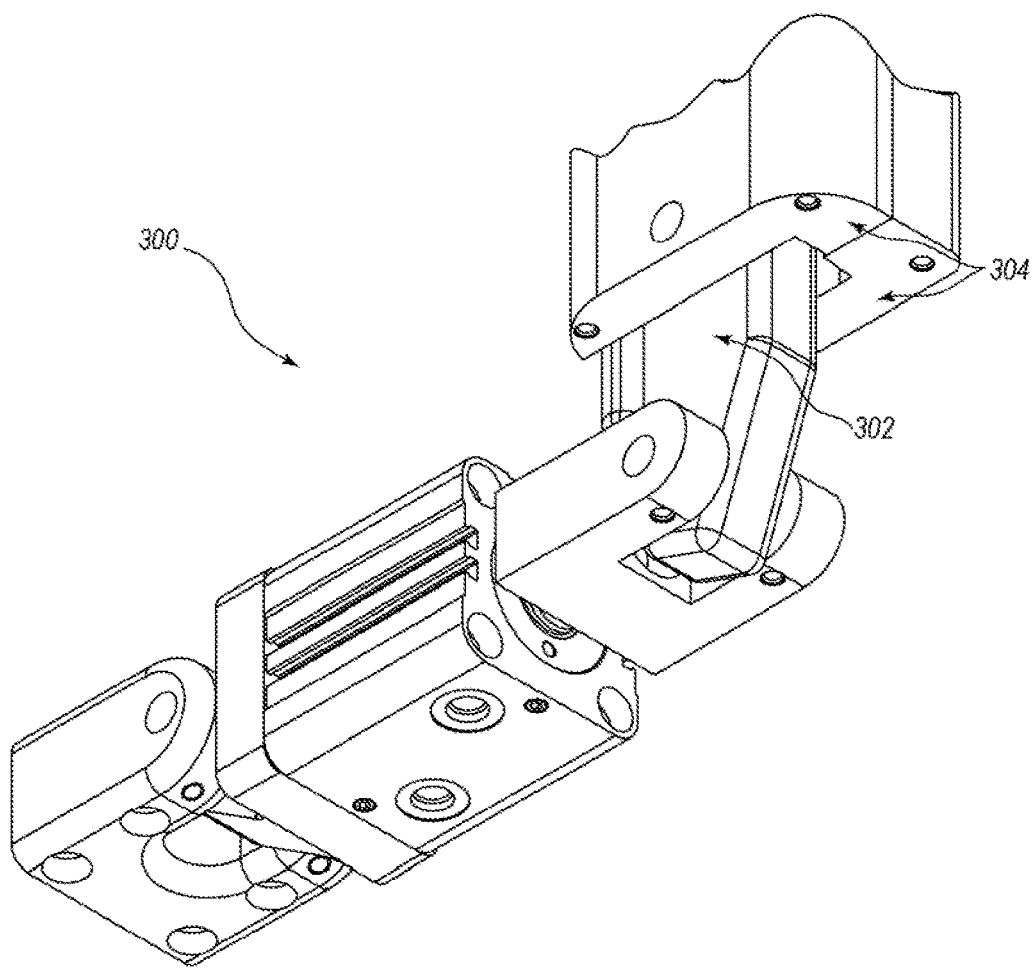
FIGS. 10-12 disclose aspects of a tool according to another example embodiment.
Figure 11:
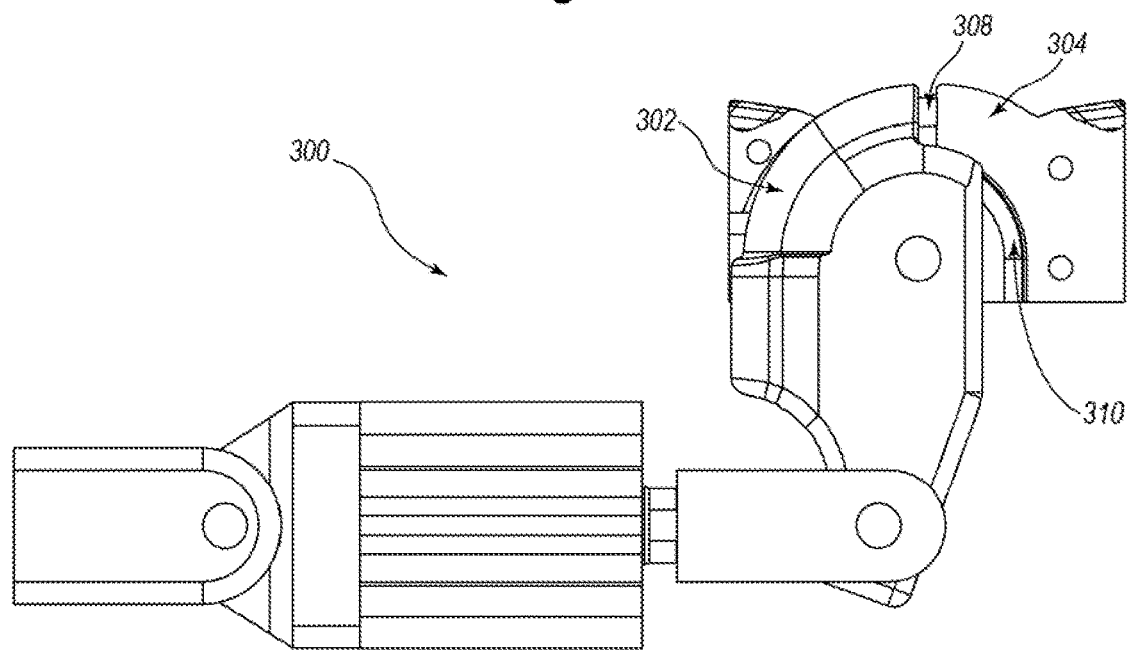
Figure 12:
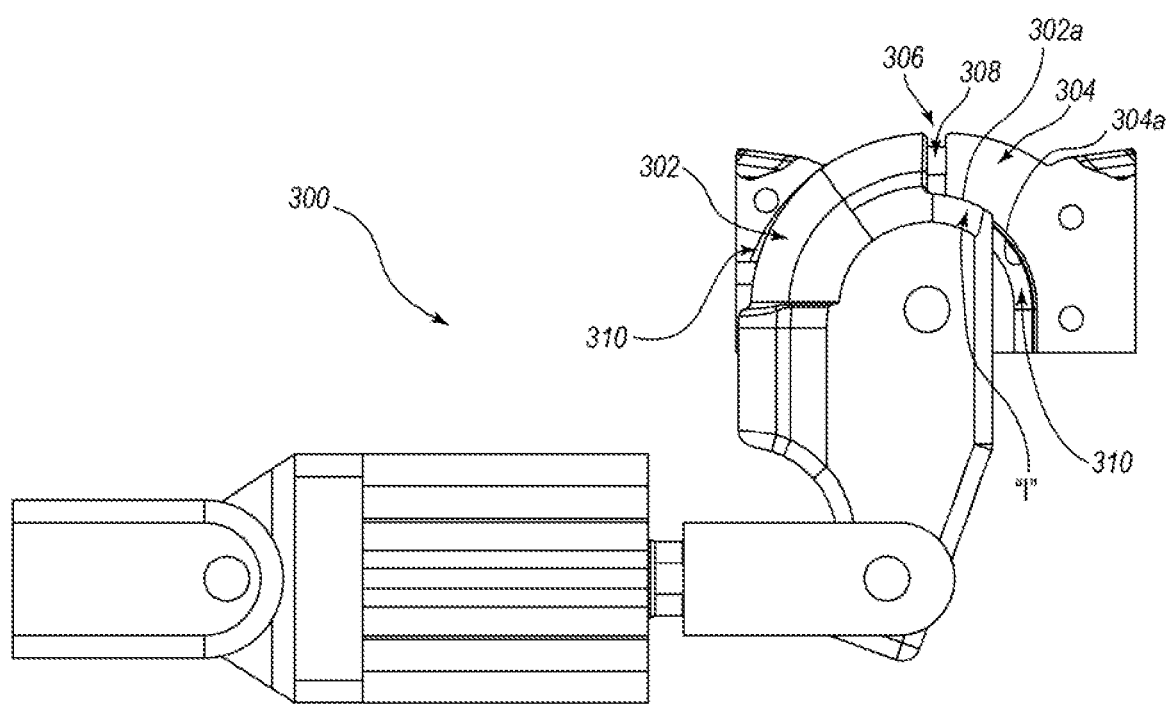

Turning now to FIGS. 10-12, details are provided concerning another example embodiment of a tool 300 that can be employed. As the tool 300 can be similar, or identical, to the tool 200 in some regards, only selected differences of the tool 300 are discussed below. Similar to the tool 200, the tool 300 can include two compression elements 302 and 304 that collectively define a gap 306 that fills with plastic during a blow-molding process. The plastic in the gap 306 can be compressed as one or both of the compression elements 302 and 304 moves toward the other of the compression elements 302 and 304. As shown, the compression element 302 can be a dynamic compression element that is movable toward a static compression element 304, and one or the other of the compression elements 302 and 304 can include an element such as a pin 308 that can form a hole, such as the hole 152a discussed above, in a compression molded element.

In the illustrated example, the compression elements 302 and 304 can have a similar configuration such that one or more recesses (see, e.g., FIGS. 3 and 4, reference 155) are formed, during molding, that are symmetrically configured and disposed relative to a compression molded element (see e.g., FIGS. 3 and 4, reference 152). By way of contrast, the compression elements 202 and 204 may have different respective configurations. As shown in the illustrative example of FIGS. 10-12, part or all of the compression element 302 can be received within the compression element 304. Further, the compression element 302 and 304 can include respective surfaces 302a and 304a, which can be curved or planar or a combination of both, that slidingly engage each other at an interface location "l." As shown, the surface 304a defined by the compression element 304 can be part of a groove 310 or tunnel in which the compression element 302 is at least partly received. In some instances, the gap between respective surfaces of two compression elements, such as surfaces 302a and 304a for example, may have a width in a range of about 0.003 inches to about 0.01 inches.

A relatively close fit between these respective surfaces 302a and 304a can help to ensure that little, or no, molten plastic escapes from the bottom of the gap 306 during the molding process. Thus, a relatively cleaner compression molded element may be produced that requires relatively less post-process trimming than would otherwise be the case. As well, prevention of the escape of compressed plastic from the gap 306, such as is enabled by the relatively close fit between surfaces 302a and 304a, helps to ensure that the desired thickness of the compression molded element is achieved and maintained during the molding process.

Figure 13:
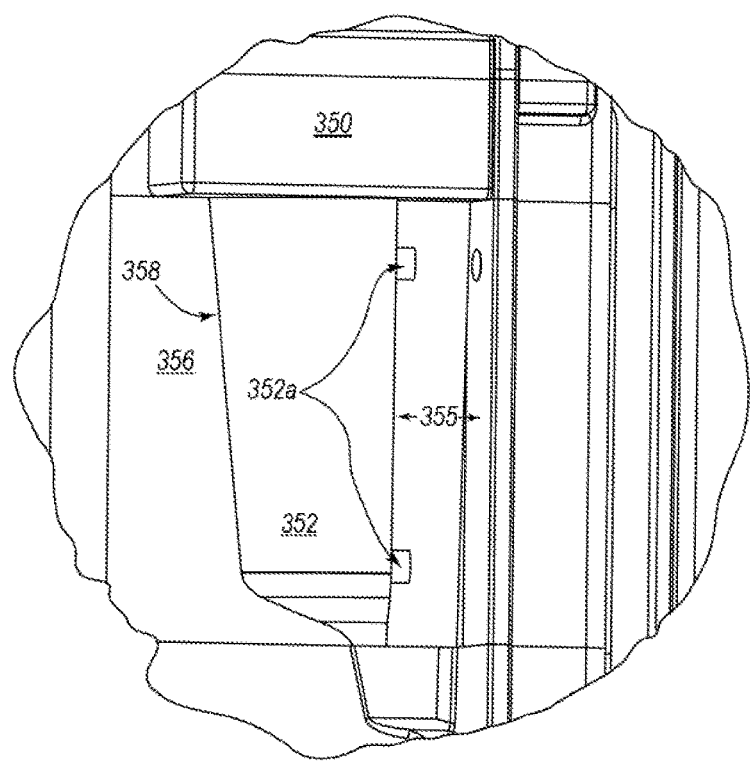
FIGS. 13-14 disclose aspects of a tool according to still another example embodiment.
Figure 14:
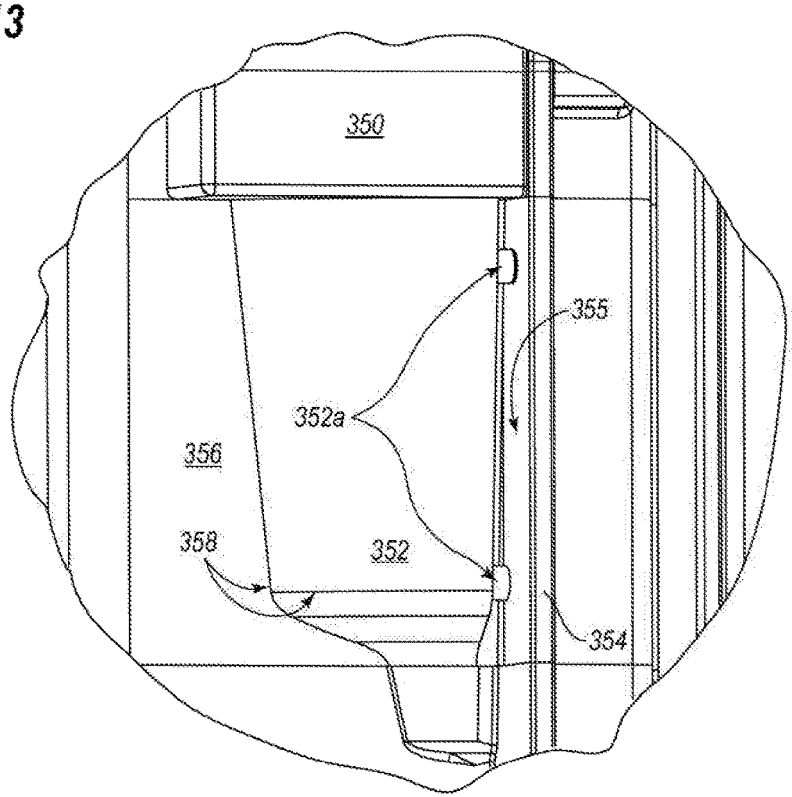

Turning now to FIGS. 13 and 14, another example configuration of a tool 350 is disclosed. Except as noted in the following discussion, the tool 350 can be similar or identical to the tool 200. Thus, the tool 350 can include a dynamic compression element 352 that is rotationally movable, relative to a static compression element 354, between the respective positions shown in FIG. 13 and FIG. 14. As noted in more detail elsewhere herein, the dynamic compression element 352 may reside in the position shown in FIG. 13 prior to the beginning of a blow-molding process, and the dynamic compression element 352 may then move to the position shown in FIG. 14 during the blow-molding process, thus trapping molten plastic in the gap 355 and compressing the plastic to form a compression molded element.

The dynamic compression element 352 can include one or more projections 352a, such as pins for example, that are configured and arranged to contact the static compression element 354 when the dynamic compression element 352 is at its closest position relative to the static compression element 354. As shown, the dynamic compression element 352 at least partly resides within a housing 356 that defines or otherwise includes the static compression element 354. As further indicated, the gap 358 between the dynamic compression element 352 and the static compression element 354 is relatively small, such that the ingress of molten plastic between the two parts is substantially, or completely, prevented.

Figure 15:
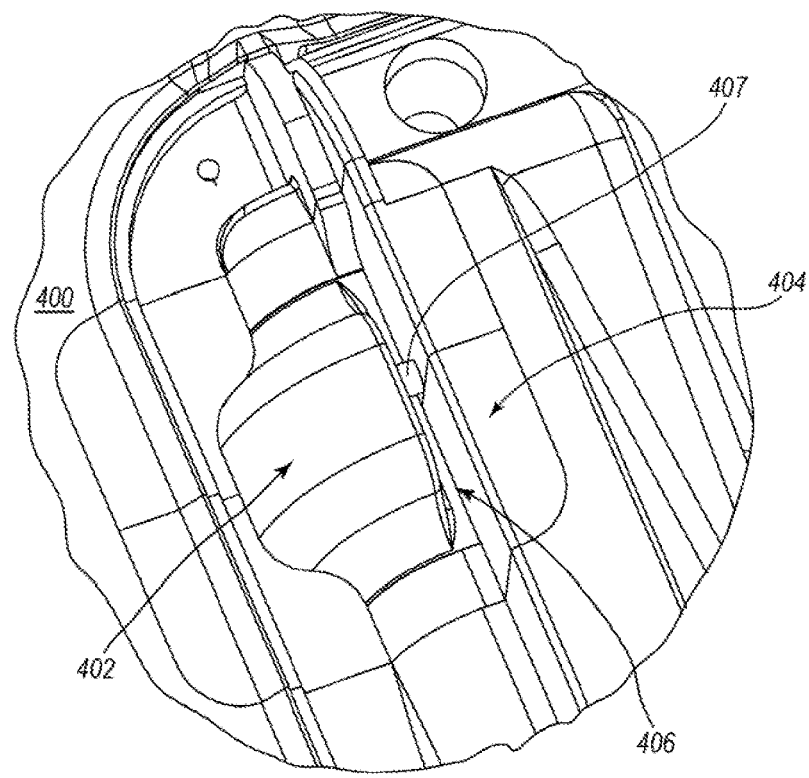
FIGS. 15-16 disclose aspects of an example mold half and associated tool.
Figure 16:
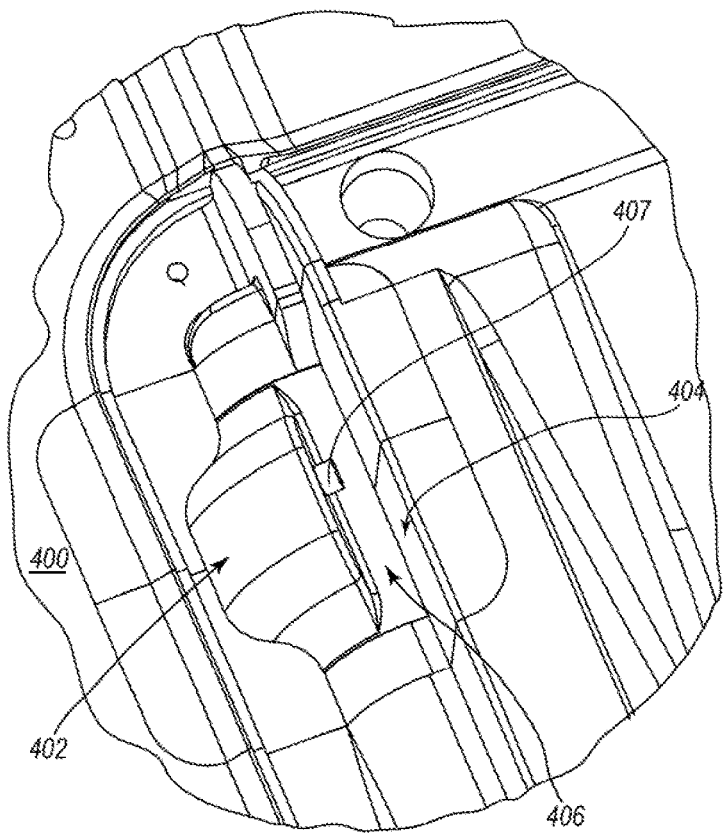

Turning next to FIGS. 15-19, details are provided concerning further example embodiments of tools that can be employed to create compression molded elements in connection with a blow-molding process. With reference first to FIGS. 15 and 16, it is noted that tools such as the example embodiments disclosed herein can be disposed anywhere, and in any orientation, within a mold that can be used in a blow-molding process. Thus, such tools and associated methods can be used to create compression molded elements in any location or orientation within, and integral with, a blow-molded structure. In this way, the compression molded element can be created substantially simultaneously with the blow-molded structure.

In more detail, a mold half, such as can be used in a blow-molding process, is denoted in FIGS. 15-16 generally at 400. Disposed within the mold half 400 are first and second compression elements 402 and 404. Similar to some other disclosed embodiments, the first compression element 402 is rotatable relative to the second compression element 404, which is fixed in position. In more detail, the first compression element 402 can be rotated back and forth between the positions respectively indicated in FIGS. 15 and 16. As shown, the gap 406 between the first compression element 402 and the second compression element 404 is relatively larger in FIG. 16 than in FIG. 15. In some embodiments, such as the example of FIG. 15, the minimum width of the gap 406 may be defined, for example, by the length of the pin 407.

At, or near, the beginning of a blow-molding process, the first compression element 402 may be positioned as shown in FIG. 16. During the blow-molding process, the first compression element 402 can be moved to the position shown in FIG. 15, thus cooperating with the second compression element 404 to compress the melted, or partly melted, plastic residing in the gap 406 to create a compression molded element integral with the blow-molded structure created in conjunction with the mold half 400. In some embodiments, the first compression element 402 is not extended, that is, moved to the position of FIG. 15 until after about 10 to about 15 seconds after inflation of the parison has commenced. At, or near, the completion of the blow-molding process, the first compression element 402 can be retracted, that is, moved back to the position shown in FIG. 16 to enable removal of the blow-molded structure and integral compression molded element from the mold half(s) 400.

As will be appreciated from the foregoing discussion, all of the mold half 400 structures, as well as the first and second compression elements 402 and 404, shown in FIGS. 15 and 16 may be in contact with melted plastic at some point during a blow-molding process. It can also be seen that a compression molded element integral with the blow-molded structure can be formed during a blow-molding process by elements other than the mold half(s) 400, that is, the first and second compression elements 402 and 404, used to create the other elements of the blow-molded structures. Put another way, and by way of contrast with the example blow-molded structure 100 discussed above, a compression molded structure can be formed in accordance with embodiments of the invention without necessitating a compression action between halves of a mold, such as the mold half 400.

Figure 17:
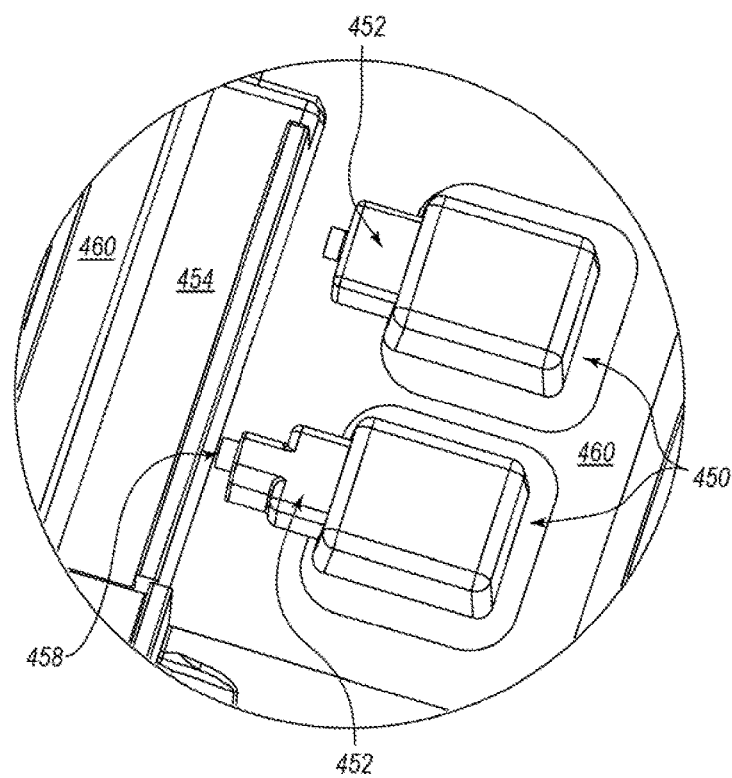
FIGS. 17-19 disclose aspects of a tool according to yet another example embodiment.
Figure 18:
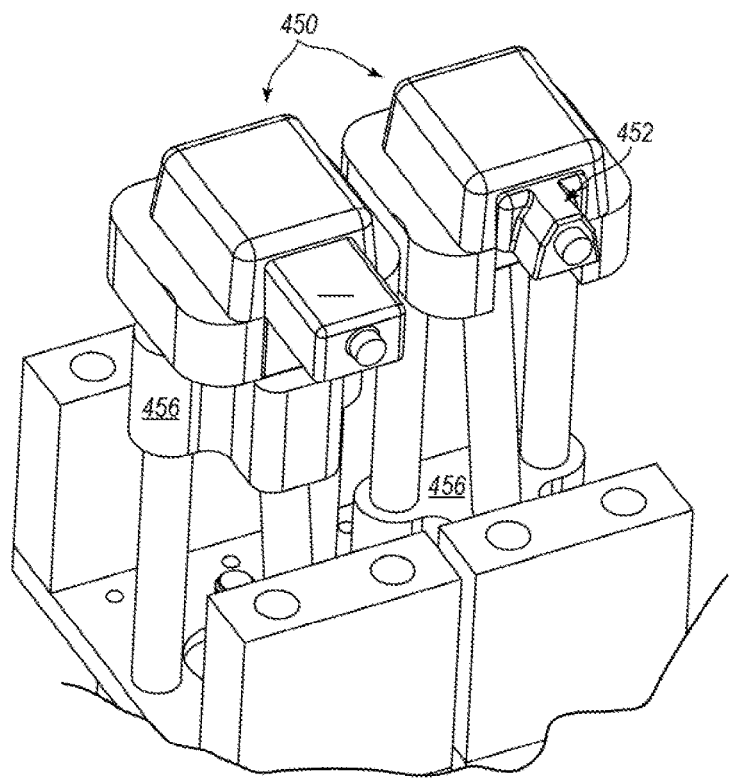
Figure 19:
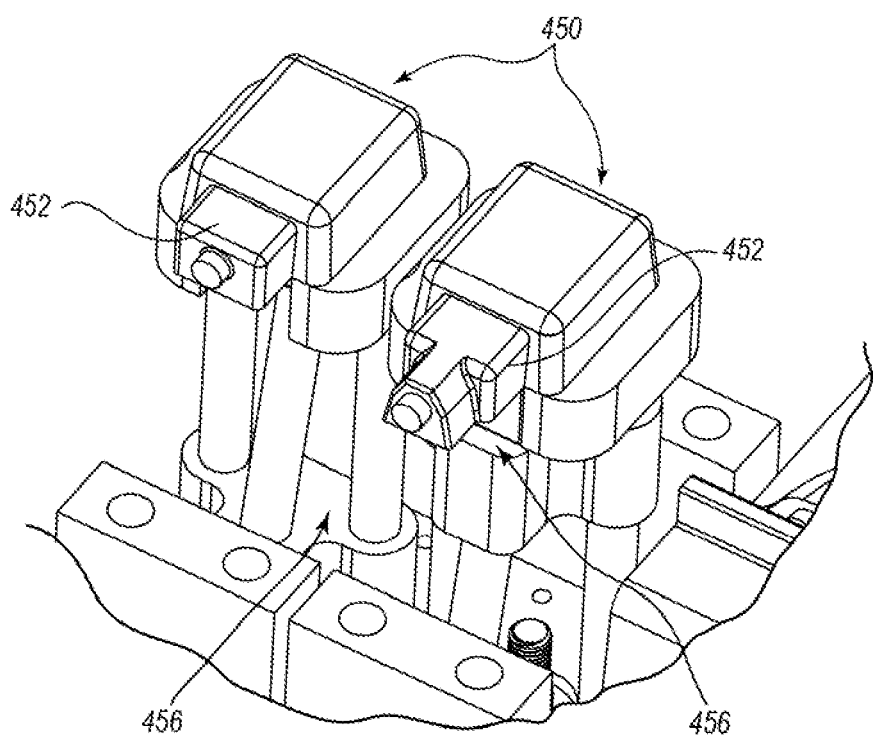
Figure 20:
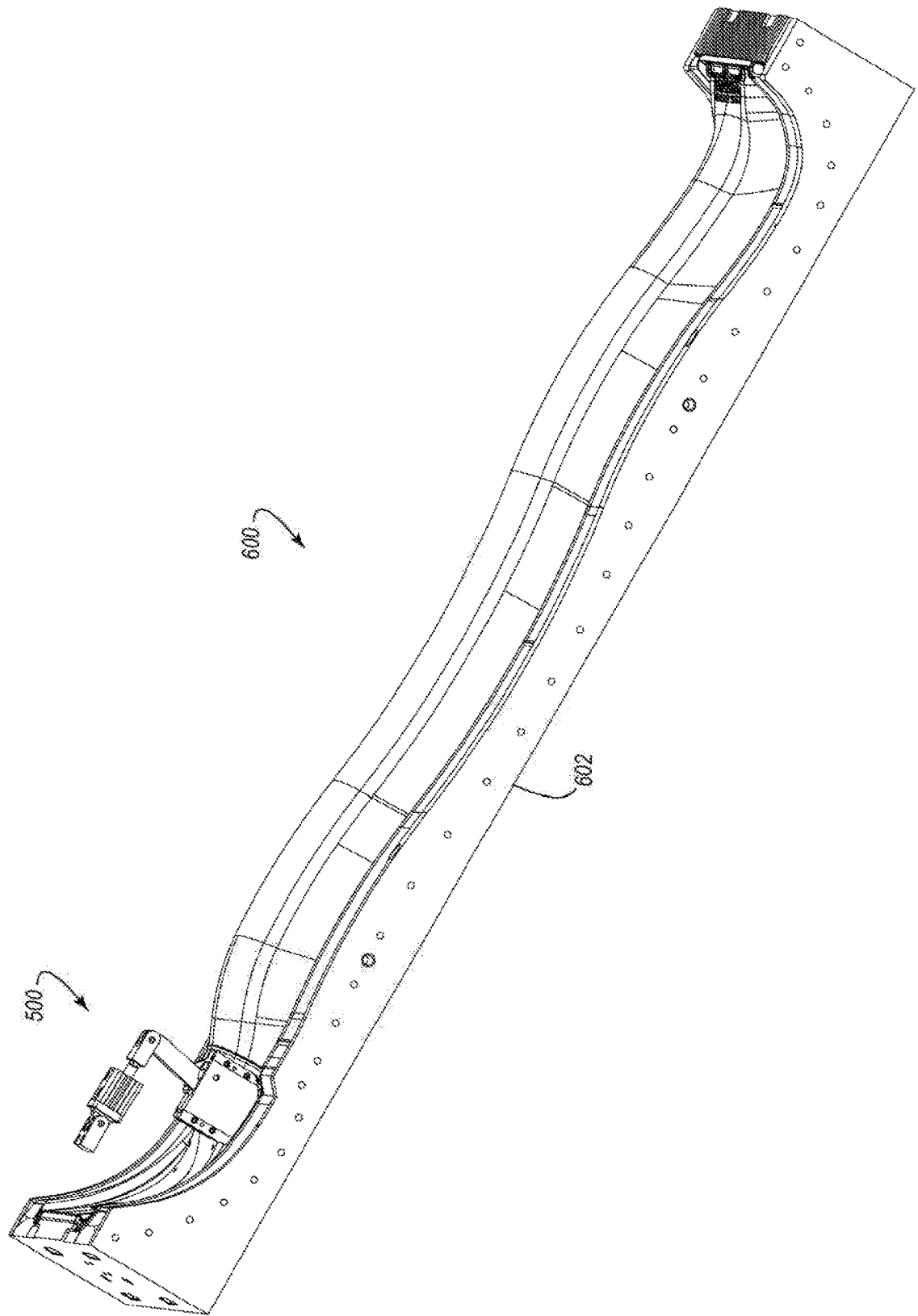
FIGS. 20-23 disclose aspects of still another example embodiment of a tool.

Turning next to FIGS. 17-19, details are provided concerning still other example embodiments of a tool, exemplified by reference 450, that can be used to create compression molded elements in a blow-molded structure. In the example of FIGS. 17-19, one or more dynamic compression elements 452 is/are provided that is configured for linear motion relative to a common static compression element 454. The dynamic compression elements 452 can move in unison with each other, or in alternating fashion (see FIG. 17), to cooperate with the static compression element 454 to create a compression molded element as part of a blow-molded structure. As shown in FIGS. 17-19, the dynamic compression elements 452 can be independently controllable by respective control mechanisms 456. Alternatively, the dynamic compression elements 452 can be controlled by a common control mechanism. As well, the dynamic compression elements 452 may or may not include a protruding structure 458, such as a pin for example. With reference to FIG. 17 in particular, and as noted in connection with FIGS. 15-16, all of the elements of the mold half 460, as well as the dynamic compression elements 452, may be in contact with melted plastic at some point during a blow-molding process.

In one alternative embodiment (not shown), two dynamic compression elements 452 can be arranged, along with respective static compression elements 454, in a back-to-back configuration. Such an arrangement can simultaneously produce two, substantially parallel, compression molded elements. Depending upon the configuration of the dynamic compression elements 452 and associated static compression elements 454, the compression molded elements thus produced can be identical to each other, or non-identical. In one alternative to the foregoing, the compression elements 452 and 454 can be arranged so that the resulting compression molded elements are non-parallel to each other.

As will be apparent from this disclosure, the disclosed tools are example structural implementations of a means for creating an integral compression molded element in a molded structure, such as a blow-molded structure. Thus, in some example implementations, the means may create the integral compression molded element without the use of any part of a mold, such as a mold half. As well, the integral compression molded element may be created by the means without the need or use for compression of plastic between two halves of a mold. Any other mechanisms or devices of comparable functionality to that of the disclosed tools can alternatively be employed.

With reference now to FIGS. 20-23, details are provided concerning still other example embodiments of a tool, one of which is referred to at 500, that can be used to create compression molded elements in a blow-molded structure. As shown, the tool 500 may be used in conjunction with a mold 600 that includes a mold half, such as a cavity side mold half 602 that can be used in a blow-molding process. In this example, the core side mold half that mates with the cavity side mold half 602 of the mold 600 is not shown. This particular example of the mold 600 is configured for use in manufacturing a watercraft, such as a kayak. However, any other mold configuration may alternatively be employed. The example tool 500 may be similar in some regards to the tool 200 discussed earlier. As such, the following discussion will focus primarily on selected differences between those two embodiments.

Figure 21:
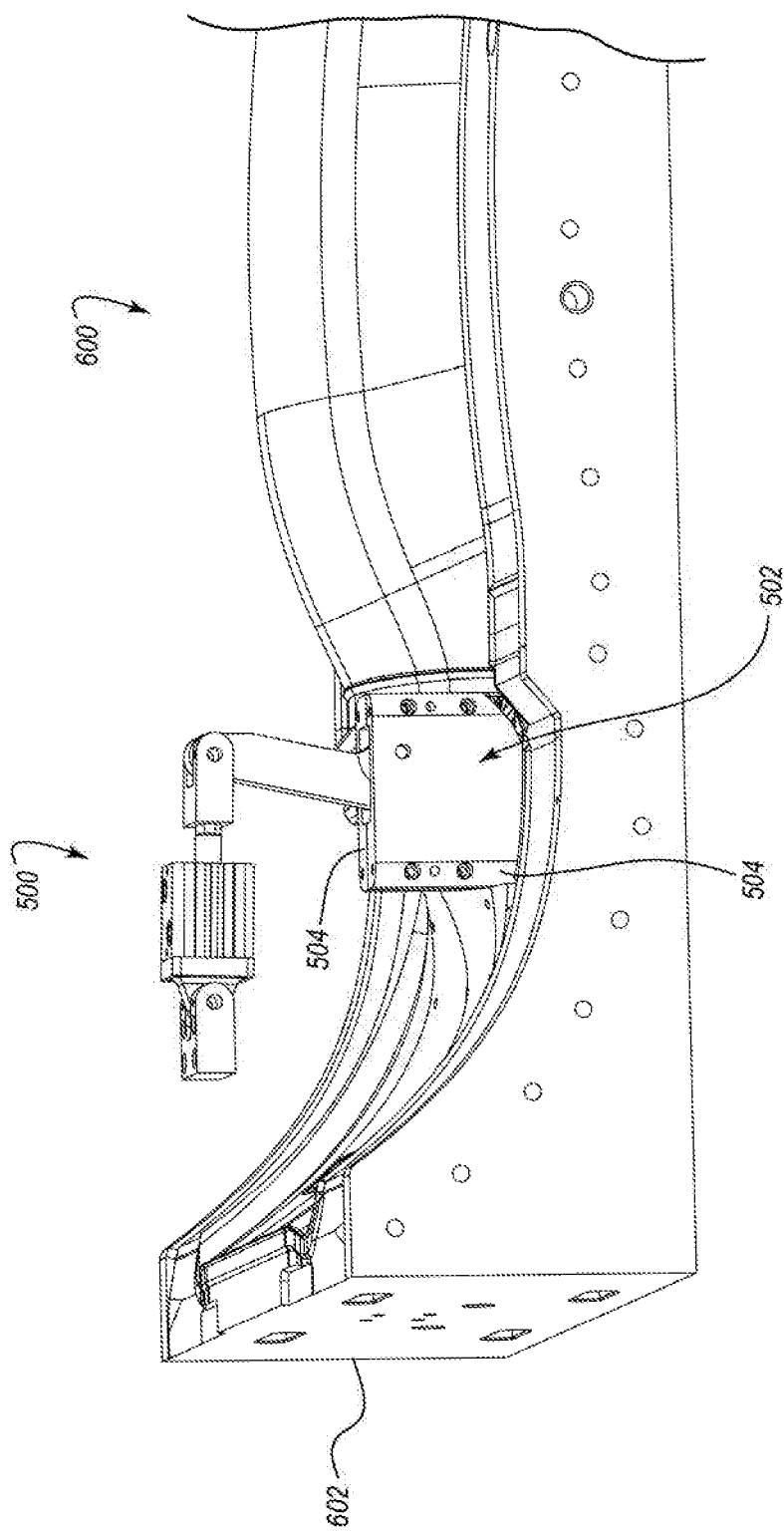

With particular reference to FIG. 21, the tool 500 may include a housing 502 that includes two separable housing halves 504 that are, in turn, removably connected to a part of the cavity side mold half 602. While the tool 500 is indicated as being attached to the cavity side mold half 602, a substantial portion of the tool 500 actually resides in the core side of the mold half (not shown) during a blow molding and compression molding process.

Figure 22:
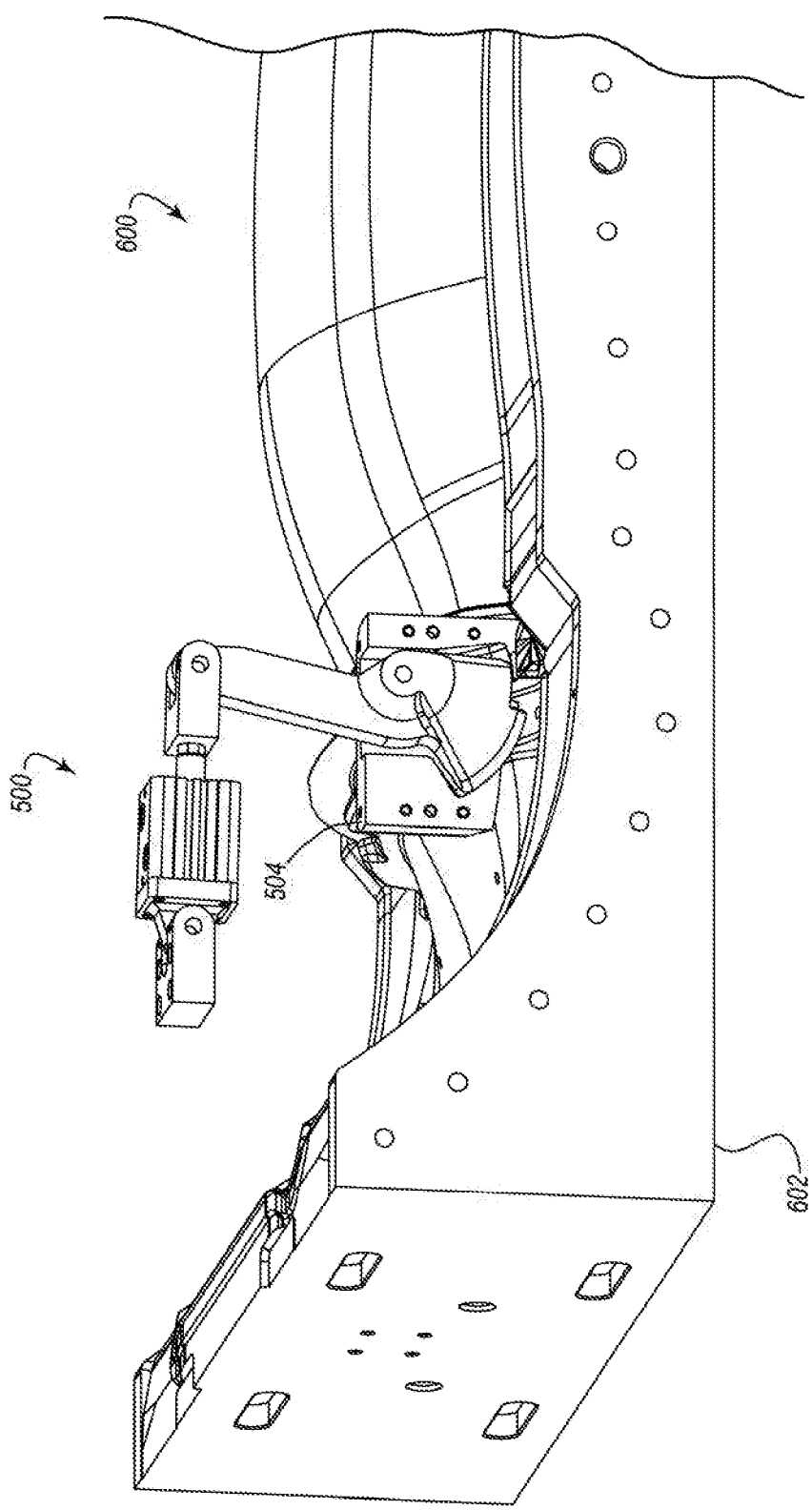
Figure 23:
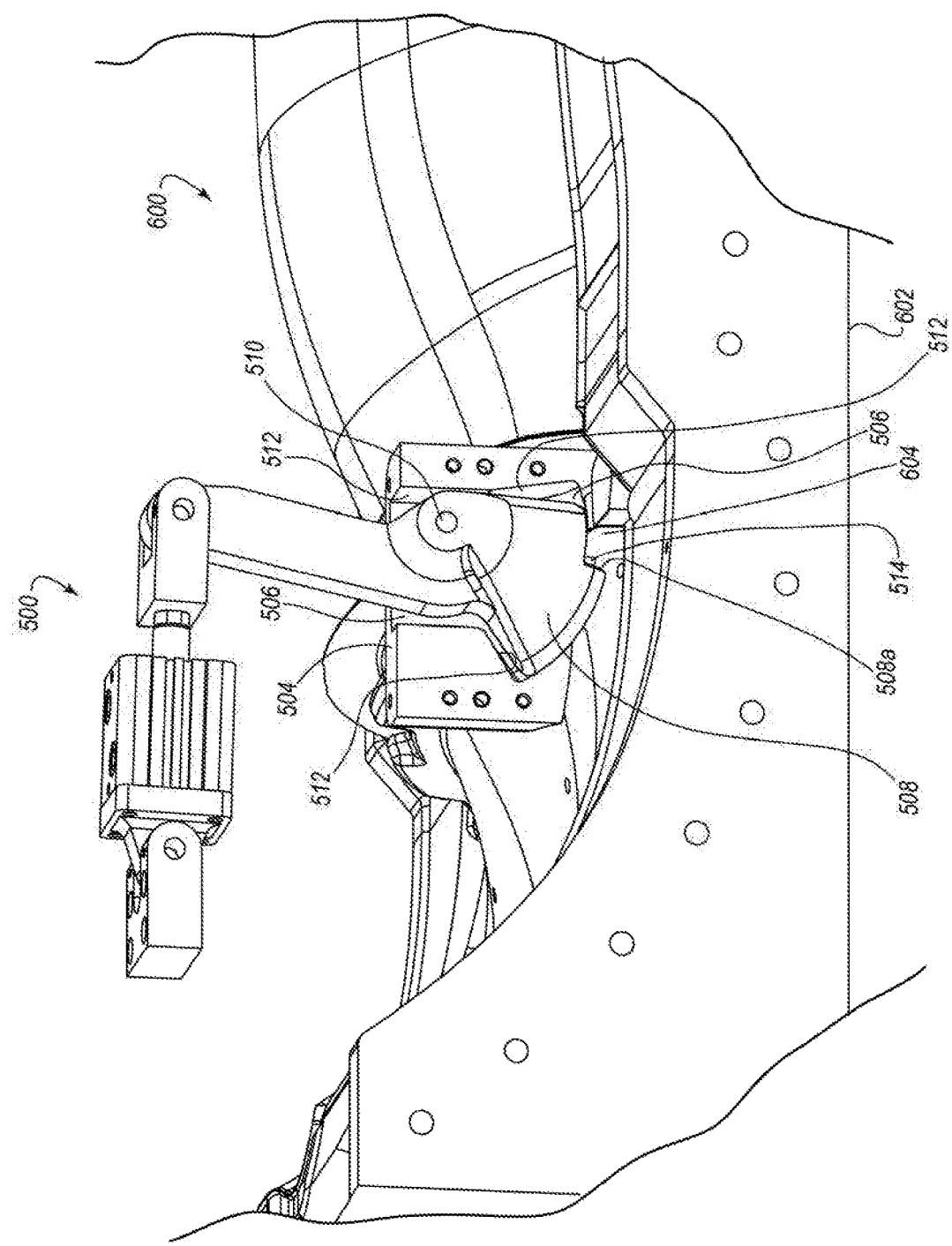

As indicated in FIGS. 22 and 23, the housing halves 504 cooperate to define an interior portion 506 within which a dynamic compression element 508 of the tool 500 is rotatably mounted, such as by way of a shaft 510. The dynamic compression element 508 includes a protrusion 512, such as a pin for example, and a rotary range of motion of the dynamic compression element 508 about the shaft 510 is defined by the size and configuration of the interior portion 506. In more detail, interior walls 512 serve to define and constrain the extent to which the dynamic compression element 508 is able to rotate.

As best shown in FIG. 23, the dynamic compression element 508 is only partially housed within the interior portion 506, and the part of the dynamic compression element 508 that includes the protrusion 514 resides outside of the interior portion 506. This arrangement enables the protrusion 514 to be selectively moved towards, and away from, the structure 604 of the cavity side mold half 602 in connection with a compression molding process.

In more detail, a compression molded element is formed during a blow molding process, or other type of molding process, when the dynamic compression element 508 rotates counterclockwise (considered from the perspective shown in FIG. 23) towards the structure 604 until the protrusion 514 is near, or contacts, the structure 604, thus compressing plastic between the structure 604 and a face 508a from which the protrusion 514 of the dynamic compression element 508 extends. In this example, the structure 604 is considered a static compression element since the structure 604 does not move as part of the compression molding process, and the dynamic compression element 508 moves relative to the structure 604. In this way, a compression molded element is created that includes either a depression or hole, and the compression molded element is created by the cooperation of the tool 500, namely, the dynamic compression element 508, with the mold 600, namely, the structure 604 of the cavity side mold half 602.

C. Further Aspects of Some Example Tools

As noted in the discussion herein regarding various embodiments of a tool that can be used in conjunction with a blow-molding process to create an integral compression molded element anywhere in an associated blow-molded structure, various embodiments of the tool are concerned with defining a gap into which plastic flows and is later compressed. Because the plastic is in a melted, or molten, state when it enters the gap, the plastic is potentially vulnerable to blowouts, that is, holes in the plastic, if stretched too thinly during a compression molding evolution. Thus, parameters such as the dimensions of a gap, such as width, length and depth should be selected to ensure that the compression molded element has adequate thickness but is not so thick/deep/wide that a blowout may occur during formation of the compression molded element.

For example, it has been found in some cases that with respect to a gap having a generally rectangular cross-section of perimeter 3X (where X is the width of the gap, as well as the depth of the gap), good results can be obtained when the ratio $1/3X <$ about 2. Thus, in some embodiments at least, good results may be obtained when X is <about 1/6, or about 0.167. However, the scope of the invention is not limited to these example dimensions, or relationships between dimensions.

It is also noted that even where a gap may otherwise be sized and configured to give rise to a potential blowout, the tool used to create the compression molded element can be configured to reduce, or avoid, the likelihood of a blowout. For example, a tool with two dynamic compression elements can operate such that each of the compression elements pulls some plastic into the gap between the two compression elements. Because the plastic is being pulled from two areas rather than one, it is less likely that a blowout will occur.

Yet other parameters, such as time-related parameters, can also be employed to help ensure formation of a compression molded element without giving rise to attendant problems, or at least reducing the likelihood that such problems will occur. For example, relatively better results may be obtained by delaying movement of a dynamic compression element until after about 10 to about 15 seconds after inflation of the parison begins. This delay may help to ensure that the melted plastic of the parison is in substantial contact with all portions of the inside of the mold halves, as well as with the compression elements disposed inside the mold half, or mold halves.

D. Aspects of Some Example Methods

As disclosed herein, some example embodiments of production methods involve the creation of a blow-molded structure that includes one or more integral compression molded elements. The compression molded elements can be formed contemporaneously with the blow-molded structure with which they are integrated.

Figure 24:
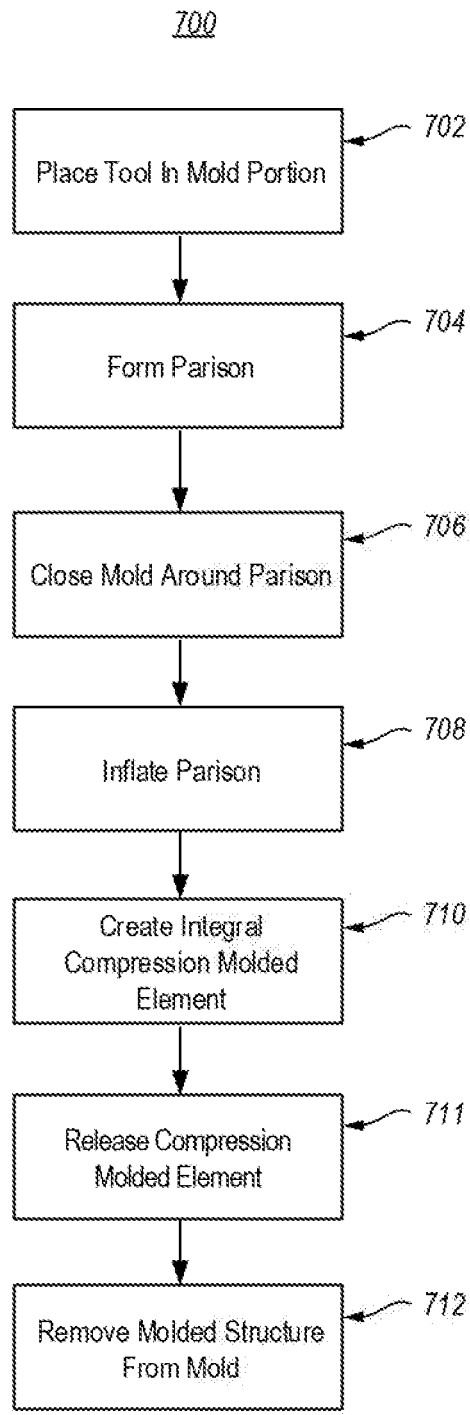
FIG. 24 is a flow diagram disclosing an example embodiment of a production method.

In general, and with reference to FIG. 24, one example production method is denoted at 700. The method 700 may begin when a tool, examples of which are disclosed herein, is placed in or attached to 702 a portion of a mold, such as a core side half of a mold, or a cavity side half of a mold. Next, a parison of melted plastic is formed 704, such as by an extrusion blow molding machine for example, and the mold is closed 706 around the parison. The parison is then inflated 708 so that the plastic comes into substantial contact with some, or all, interior portions of the mold, and also into contact with the tool. In some cases, a pre-blow process is performed prior to inflation of the parison 708.

After a suitable time interval, examples of which are disclosed herein, the tool is operated 710 to create a compression molded element that is integral with the blow molded structure. Operation of the tool 710 may involve rotational and/or linear movement of one or both of a first compression element and second compression element toward the other compression element so that plastic in the mold is compressed between the two compression elements. In one particular example embodiment, the tool may be operated 710 about 20 seconds after the parison is inflated 708, although shorter or longer time intervals may be used. The compression molded element resides within or the mold and in at least some instances, is formed at a location other than an edge or parting line of the blow molded structure. The compression molded element may lie in a plane that is non-parallel with respect to a plane in which part or all of the parting line lies.

After the compression molded element has been created 710, a time interval may be allowed to pass before the compression molded element is released 711 from the tool. In some example embodiments, this time interval may be about 60 seconds, although shorter or longer time intervals may be used. The release 711 of the compression molded element may involve linear and/or rotational movement of a first compression element away from a second compression element, such that the compression molded element is no longer held between the first compression element and the second compression element. As disclosed herein, the first and second compression elements may both be movable relative to each other or, alternatively, only one of the first and second compression elements is movable relative to the other of the first and second compression elements.

After the compression molded element has been released 711 by the compression element(s), the blow molded structure, which includes the integral compression molded element, can then be removed 712 from the mold.

E. Some Example Alternative Embodiments

Figure 25:
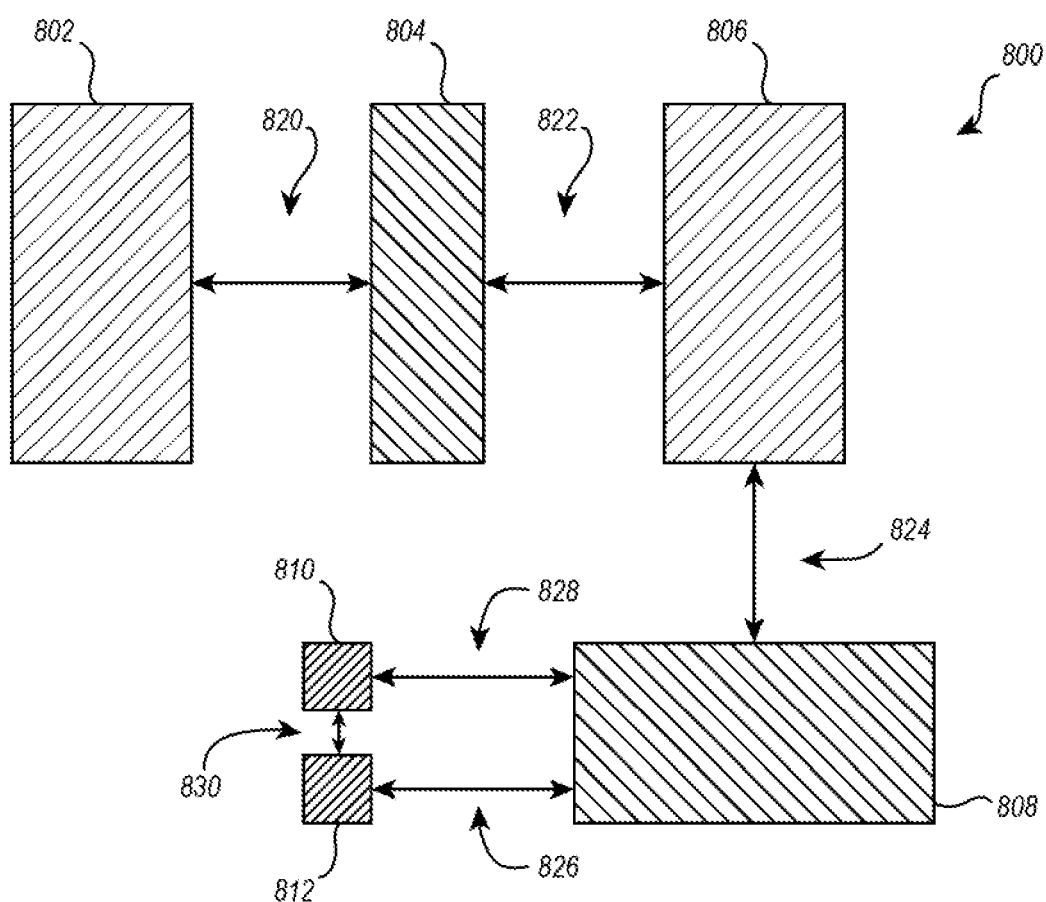
FIG. 25 is a block diagram of an example configuration that includes more than two compression elements.

With reference finally to FIG. 25, another example embodiment is disclosed that is generally denoted at 800. In contrast with some other embodiments disclosed herein, the configuration 800 includes more than two compression elements. As such, arrangements such as the example shown in FIG. 25 may produce multiple compression molded elements that are each integrally formed as part of a single blow-molding process to form a single blow-molded structure. The example arrangement of FIG. 25 may be employed with other molding processes also and is not limited to use with blow-molding processes.

It will thus be apparent from FIG. 25 that a wide variety of alternative tools and structures are possible. To illustrate, any three or more of the example compression elements disclosed in FIG. 25 can be employed together in a given tool and/or mold configuration to produce two or more compression molded elements in a given molded structure.

While the compression elements 802 . . . 806, for example, are illustrated as arranged in a linear fashion, that is not required. Thus, in one example arrangement, a compression element 808 may be provided that is not linearly arranged with respect to the compression elements 802 and 804. As well, a one or more compression elements, such as compression elements 810 and 812 for example, may be provided that cooperate with one or more other compression elements, such as the compression element 808 for example, to produce one or more compression molded elements that are integral with a blow molded structure. The compression elements 810 and 812 may operate in unison, or otherwise.

Any one or more of the compression elements 802 . . . 812 may be movable, linearly and/or rotationally, relative to any one or more of the other compression elements 802 . . . 812. As well, any one or more of the compression elements 802 . . . 812 may be fixed relative to any one or more of the other compression elements 802 . . . 812. Moreover, any one or more of the compression elements 802 . . . 812 may comprise a portion of a mold. Further, any one or more of the compression elements 802 . . . 812 may include one or more straight and/or curved surfaces that are involved in the compression of plastic to form a compression molded element.

As also shown in FIG. 25, the various compression elements 802 . . . 812 may cooperatively define one or more gaps 820 . . . 830. The gaps 820 . . . 830 may be of any shape, size, or orientation and are not limited to the examples disclosed in FIG. 25 or elsewhere herein. As well, the gaps 820 . . . 830 may be arranged in any manner relative to each other.

F. Possible Advantages of Various Embodiments

As disclosed herein, embodiments of the invention may provide one or more advantages. For example, an integral compression molded element can be created anywhere within a blow-molded structure, and is not limited to being located near an edge or perimeter of the blow-molded structure. As another example, the compression molded element can be created by structures, tools, or devices other than the mold halves used to create the blow-molded structure with which the compression molded element is integral. As a final example, the compression molded element can generally lie in a plane that is non-parallel with respect to the a plane in which a parting line lies.

G. Additional Example Embodiments

Following is a listing of additional example embodiments of the invention.

Embodiment 1. An apparatus, comprising: a mold including separable halves and operable to enable creation of a blow-molded structure; and a tool disposed within the mold and comprising: a first compression element; and a second compression element, wherein the first and second compression elements are configured and arranged so that one of the compression elements is movable relative to the other compression element, and the compression elements collectively define a gap into which plastic inside the mold can be deposited.

Embodiment 2. The apparatus as recited in embodiment 1, wherein the tool is configured to create a compression molded element that resides entirely within one of the mold halves.

Embodiment 3. The apparatus as recited in embodiment 1, wherein a width of the gap is variable.

Embodiment 4. The apparatus as recited in embodiment 1, wherein the movable compression element is configured for either linear movement or rotational movement relative to the other compression element.

Embodiment 5. The apparatus as recited in embodiment 1, wherein the gap defined by the compression elements is in communication with the interior of the mold.

Embodiment 6. The apparatus as recited in embodiment 1, wherein no portion of the gap is defined by structure of either of the mold halves.

Embodiment 7. The apparatus as recited in embodiment 1, wherein the tool is operable independently of the mold halves.

Embodiment 8. The apparatus as recited in embodiment 1, wherein each of the compression elements is movable relative to the other compression element.

Embodiment 9. An apparatus, comprising: a housing; and a dynamic compression element connected to the housing and configured and arranged to be movable relative to a structure external to the apparatus, and the compression element cooperates with the structure to collectively define a gap into which plastic inside the mold can be deposited, wherein the structure is part of a mold.

Embodiment 10. The apparatus as recited in embodiment 9, wherein the dynamic compression element is rotatable, and a range of rotation of the dynamic compression element is partly defined by the structure of the mold.

Embodiment 11. An apparatus, comprising: a mold including separable halves and operable to enable creation of a blow-molded structure; and a tool disposed within the mold and comprising a dynamic compression element configured and arranged to be movable relative to a structure external to the apparatus, and the compression element cooperates with the structure to collectively define a gap into which plastic inside the mold can be deposited, wherein the structure is part of a mold.

Embodiment 12. A method, comprising: positioning, in a mold with separable halves, a tool operable to create a compression molded element; placing a tool in a portion of a mold; forming a parison of melted plastic; closing the mold halves around the parison and tool such that the tool is positioned between a mold half and the parison; inflating the parison so that the plastic comes into substantial contact with some, or all, interior portions of the mold halves; operating the tool to form an integral compression molded element within the mold; operating the tool again to release the compression molded element; separating the mold halves; and removing the blow-molded structure that includes the integral compression molded element(s).

Embodiment 13. Any molded structure produced by the method of embodiment 12.

Embodiment 14. A structure, comprising: a body having a unitary, single-piece construction that is substantially hollow; and a solid compression molded element integral with the body.

Embodiment 15. The structure as recited in embodiment 14, wherein the compression molded element is completely disposed within an envelope defined by surfaces and edges of the structure such that no portion of the compression molded element extends to an edge of the structure.

Embodiment 16. The structure as recited in embodiment 14, wherein the compression molded element lies in a plane that is non-parallel to a plane in which a parting line of the structure lies.

Embodiment 17. The structure as recited in embodiment 14, wherein the structure is a blow-molded structure.

Embodiment 18. The structure as recited in embodiment 14, wherein the compression molded element is completely disposed within an envelope defined by surfaces and edges of the structure such that no portion of the compression molded element extends to a parting line of the structure.

Embodiment 19. The structure as recited in embodiment 14, wherein the entire compression molded element is spaced apart from a parting line of the structure.

Embodiment 20. An apparatus, comprising: a mold including separable halves and operable to enable creation of a blow-molded structure; and a tool disposed within the mold and comprising: a first compression element, a second compression element, and a third compression element, wherein the first, second and third compression elements are configured and arranged so that one or more of the compression elements are movable relative to one or more of the other compression elements, so that two gaps or spaces are collectively defined into which plastic inside the mold can be deposited, each of the two or more gaps or spaces corresponding to a respective compression molded element.

Although this disclosure has been described in terms of certain embodiments, other embodiments apparent to those of ordinary skill in the art are also within the scope of this disclosure. Accordingly, the scope of the disclosure is intended to be defined only by the claims which follow.

What is claimed is:

1. A method, comprising:
positioning a tool in a mold;
forming a parison of melted plastic;
closing the mold around the parison and tool such that part of the tool is positioned between a portion of the mold and the parison;
creating a blow molded structure by inflating the parison so that the melted plastic comes into contact with an interior portion of the mold, and some of the melted plastic fills a gap between two portions of the tool; and
after the mold is closed, operating the tool to compress the melted plastic between the two portions and form a solid integral compression molded element within the mold.

2. The method as recited in claim 1, wherein a parting line formed by the mold in the blow molded structure forms no part of the integral compression molded element, and wherein the integral compression molded element comprises a permanent element of the blow molded structure.

3. The method as recited in claim 1, wherein no part of the integral compression molded element is formed by the mold.

4. The method as recited in claim 1, wherein operation of the tool is delayed about 10 to about 20 seconds after inflation of the parison.

5. The method as recited in claim 2, wherein the integral compression molded element is formed in a plane that is non-parallel with respect to a plane in which the parting line resides.

6. The method as recited in claim 1, wherein operating the tool comprises forming an opening with the tool while the integral compression molded element is being formed, and structure that defines the opening is integral with the integral compression molded element.

7. The method as recited in claim 1, further comprising creating a tack-off that is integral with the blow-molded structure.

8. The method as recited in claim 1, wherein operating the tool comprises forming a recess with the tool while the integral compression molded element is being formed, and structure that defines the recess is integral with the integral compression molded element.

9. The method as recited in claim 1, wherein operating the tool comprises defining a hole extending through the solid integral compression molded element.

10. The method as recited in claim 1, wherein the blow-molded structure comprises a watercraft, and the solid integral compression molded element is located on a longitudinal centerline of the watercraft.

11. The method as recited in claim 1, wherein the blow-molded structure comprises a watercraft.

12. The method as recited in claim 9, wherein the hole is defined as the solid integral compression molded element is created.

13. The method as recited in claim 9, wherein the hole is defined by pushing a pin of the tool through the melted plastic that is situated in the gap.

14. The method as recited in claim 13, wherein a length of the pin defines a width of the gap.

15. The method as recited in claim 1, wherein the gap has a non-uniform width.

16. The method as recited in claim 7, wherein the tack-off is created within an interior of the blow-molded structure.

17. The method as recited in claim 1, wherein the blow-molded structure comprises a portion of a table.

18. The method as recited in claim 1, wherein the blow-molded structure comprises a portion of a chair.

19. The method as recited in claim 1, wherein the blow-molded structure comprises a portion of a shed.

20. The method as recited in claim 1, wherein the blow-molded structure comprises a portion of a storage box.

* * * * *